US008150370B2

(12) United States Patent
Dempo et al.

(10) Patent No.: US 8,150,370 B2

(45) Date of Patent: Apr. 3, 2012

(54) AUTHENTICATION SYSTEM, AUTHENTICATION METHOD AND AUTHENTICATION DATA GENERATION PROGRAM

(75) Inventors: Hiroshi Dempo, Tokyo (JP); Shozo Fujino, Tokyo (JP)

(73) Assignee: NEC Corporation, Tokyo (JP)

( * ) Notice: Subject to any disclaimer, the term of this patent is extended or adjusted under 35 U.S.C. 154(b) by 1218 days.

(21) Appl. No.: 11/721,315

(22) PCT Filed: Dec. 5, 2005

(86) PCT No.: PCT/JP2005/022310

§ 371 (c)(1), (2), (4) Date: Jun. 8, 2007

(87) PCT Pub. No.: WO2006/062066

PCT Pub. Date: Jun. 15, 2006

(65) Prior Publication Data

US 2009/0239502 A1 Sep. 24, 2009

(30) Foreign Application Priority Data

Dec. 8, 2004 (JP) ................................ 2004-356061

(51) Int. Cl.
*H04W 4/00* (2009.01)

(52) U.S. Cl. ........................................ 455/411; 713/184

(58) Field of Classification Search .................. 455/411; 713/184

See application file for complete search history.

(56) References Cited

U.S. PATENT DOCUMENTS

| | | | | |
|---|---|---|---|---|
| 2005/0015604 | A1 * | 1/2005 | Sundararajan et al. | 713/184 |
| 2006/0156385 | A1 * | 7/2006 | Chiviendacz et al. | 726/2 |

FOREIGN PATENT DOCUMENTS

| | | | |
|---|---|---|---|
| JP | 08-140141 | A | 5/1996 |
| JP | 11-178057 | A | 7/1999 |
| JP | 2000-197114 | A | 7/2000 |
| JP | 2002-262360 | A | 9/2002 |
| JP | 2002-279205 | A | 9/2002 |
| JP | 2002-288139 | A | 10/2002 |
| JP | 2003-132022 | A | 5/2003 |
| JP | 2003-186848 | A | 7/2003 |
| JP | 2003-235082 | A | 8/2003 |
| JP | 2004-72631 | A | 3/2004 |
| JP | 2004-128890 | A | 4/2004 |
| JP | 2004-171069 | A | 6/2004 |

* cited by examiner

*Primary Examiner* — Pierre-Louis Desir

(74) *Attorney, Agent, or Firm* — Sughrue Mion, PLLC

(57) ABSTRACT

An authentication system according to the present invention includes an AAA server configured to be connected to the mobile network; a terminal device configured to be connected to the mobile network and be authenticated by the AAA server; and a PC configured to be connected to the terminal device through a short distance radio communication network. The PC transmits an identification data for identifying the PC itself to the terminal device through the short distance radio communication network. The terminal device authenticates the PC to access the mobile network on the basis of the identification data, and transmits an authentication data for accessing the mobile network to the AAA server. The AAA server performs an authentication that the PC accesses to the mobile network by using the authentication data. The authenticated PC accesses the mobile network through the Internet.

25 Claims, 22 Drawing Sheets

START AUTHENTICATION DATA GENERATING PROCESS

S102 ENTER HOME NETWORK AREA AND CONNECT TO PC

S104 ACQUIRE PERIPHERAL DEVICE NAME AND PERIPHERAL DEVICE IP ADDRESS

S106 DETERMINATION WHETHER TO AUTHORIZE ACCESS — NOT AUTHORIZE ACCESS / AUTHORIZE ACCESS

S108 GENERATE AUTHENTICATION DATA AND ASSIGN PERIPHERAL DEVICE ID

S110 NOTIFY AUTHENTICATION DATA, PERIPHERAL DEVICE ID AND PERIPHERAL DEVICE IP ADDRESS TO AAA SERVER

S112 TRANSMIT AUTHENTICATION DATA, PERIPHERAL DEVICE ID AND AAA SERVER ADDRESS TO PC

END

Fig. 7

| USER DATA | PERIPHERAL DEVICE DATA | |
|---|---|---|
| | PERIPHERAL DEVICE NAME | PERIPHERAL DEVICE ADDRESS |
| USER ID/ MOBILE TERMINAL ADDRESS | PC-A | xxx. yyy. zzz. zzz |
| | PC-B | sss. ttt. uuu. vvv |
| | ⋮ | ⋮ |
| | PC-N | ooo. ppp. qqq. rrr |

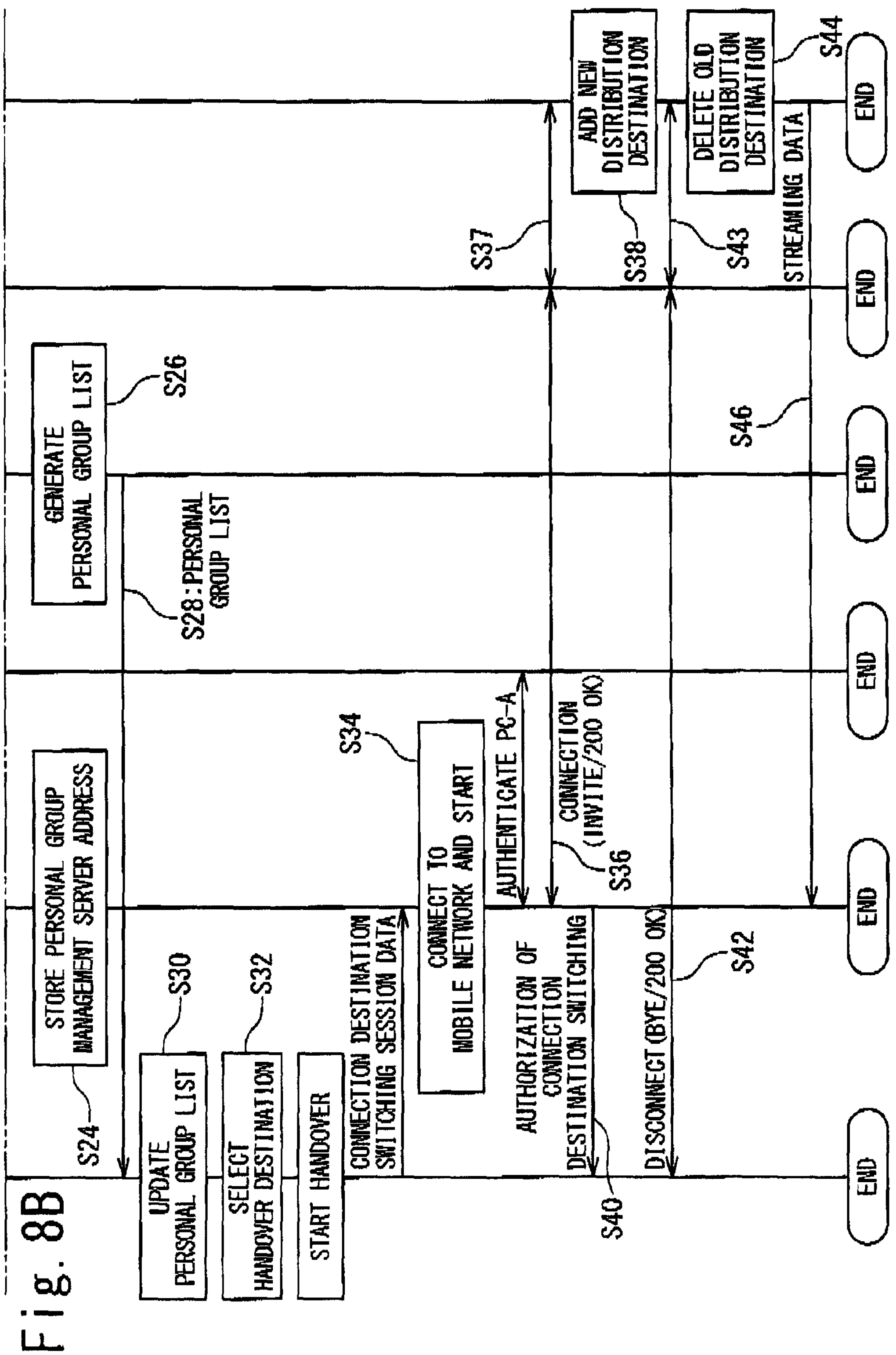
Fig. 8B
STORE PERSONAL GROUP MANAGEMENT SERVER ADDRESS
S24
GENERATE PERSONAL GROUP LIST
S26
S28: PERSONAL GROUP LIST
UPDATE PERSONAL GROUP LIST
S30
SELECT HANDOVER DESTINATION
S32
START HANDOVER
CONNECTION DESTINATION SWITCHING SESSION DATA
CONNECT TO MOBILE NETWORK AND START
S34
AUTHENTICATE PC-A
CONNECTION (INVITE/200 OK)
S36
S37
ADD NEW DISTRIBUTION DESTINATION
S38
AUTHORIZATION OF CONNECTION DESTINATION SWITCHING
S40
DISCONNECT (BYE/200 OK)
S42
S43
DELETE OLD DISTRIBUTION DESTINATION
S44
STREAMING DATA
S46
END
END
END
END
END
END
END

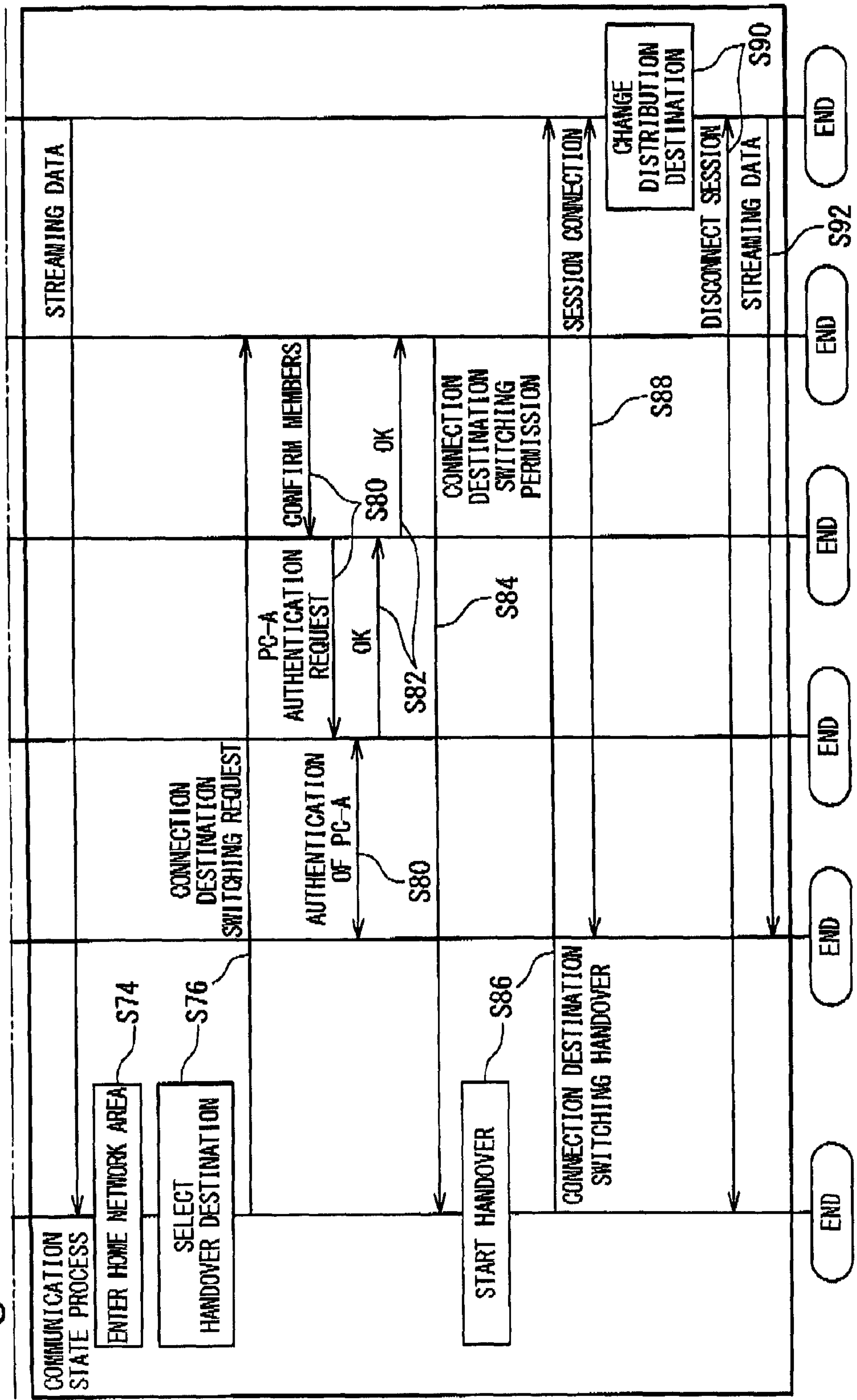
Fig. 17B
COMMUNICATION STATE PROCESS
ENTER HOME NETWORK AREA
S74
SELECT HANDOVER DESTINATION
S76
STREAMING DATA
CONNECTION DESTINATION SWITCHING REQUEST
AUTHENTICATION OF PC-A
S80
PC-A AUTHENTICATION REQUEST
OK
S82
CONFIRM MEMBERS
S80
OK
CONNECTION DESTINATION SWITCHING PERMISSION
S84
START HANDOVER
S86
CONNECTION DESTINATION SWITCHING HANDOVER
S88
SESSION CONNECTION
CHANGE DISTRIBUTION DESTINATION
S90
DISCONNECT SESSION
STREAMING DATA
S92
END
END
END
END
END
END
END
END

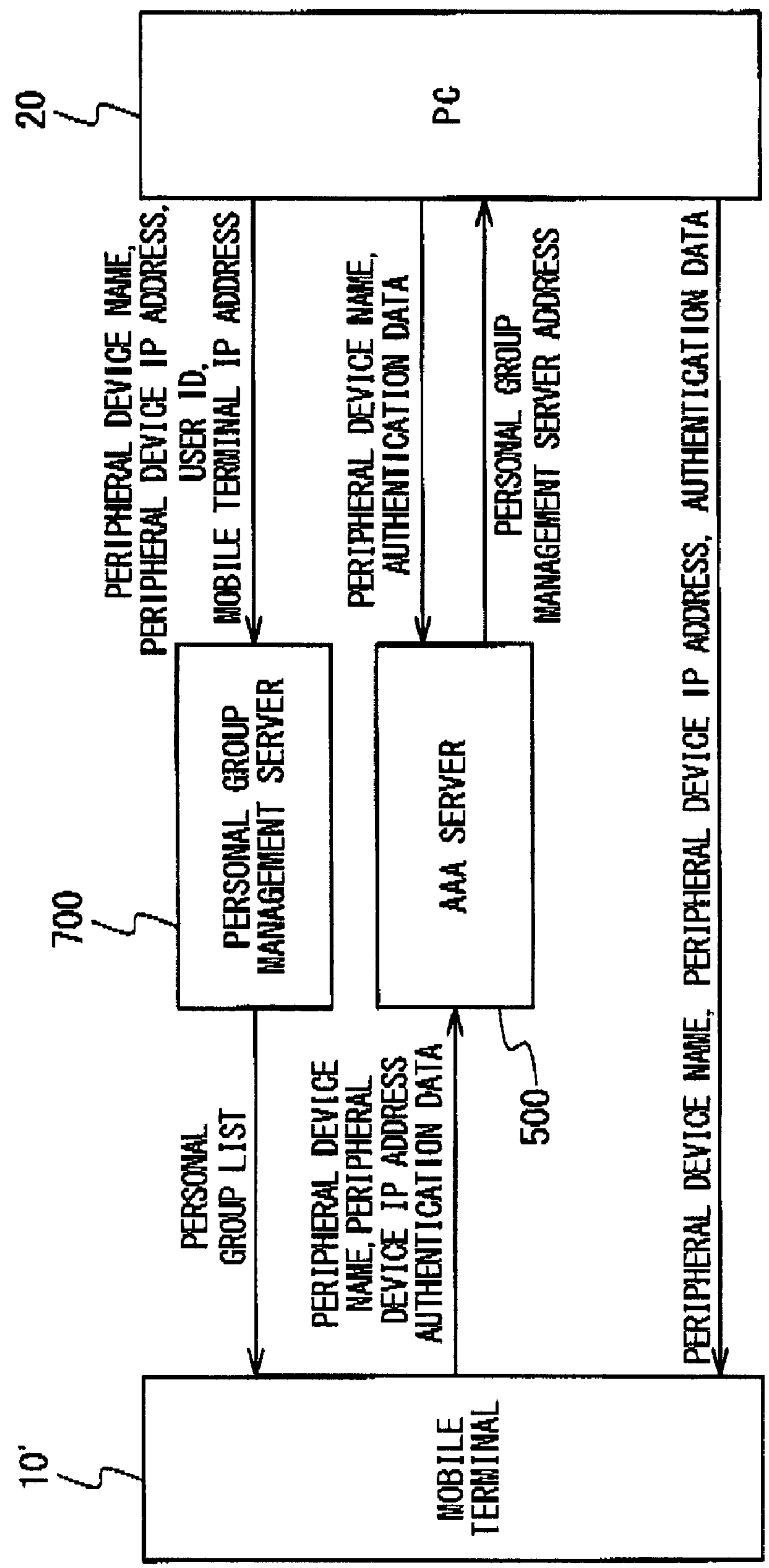
Fig. 18
20
PC
PERIPHERAL DEVICE NAME,
PERIPHERAL DEVICE IP ADDRESS,
USER ID,
MOBILE TERMINAL IP ADDRESS
PERIPHERAL DEVICE NAME,
AUTHENTICATION DATA
PERSONAL GROUP
MANAGEMENT SERVER ADDRESS
700
PERSONAL GROUP
MANAGEMENT SERVER
AAA SERVER
500
PERSONAL
GROUP LIST
PERIPHERAL DEVICE
NAME, PERIPHERAL
DEVICE IP ADDRESS
AUTHENTICATION DATA
PERIPHERAL DEVICE NAME, PERIPHERAL DEVICE IP ADDRESS, AUTHENTICATION DATA
10'
MOBILE
TERMINAL

AUTHENTICATION SYSTEM, AUTHENTICATION METHOD AND AUTHENTICATION DATA GENERATION PROGRAM

TECHNICAL FIELD

The present invention relates to an authentication system, an authentication method and an authentication data generating program in order to connect a terminal to a communication system, and particularly relates to an authentication system, an authentication method and an authentication data generating program in order to switch connection from a terminal which is connected to a communication system to another terminal.

BACKGROUND ART

A network in recent years such as a mobile phone system and a wireless LAN service is configured by many network providers, and each provider executes access or connection authentication with respect to access or connection to each own network. In this access authentication, a network identifies each user by a subscriber ID. This subscriber ID is stored in a terminal main body and an IC card accessible to a terminal, or the like.

An example of a conventional system is disclosed in Japanese Laid-Open Patent Application JP2004-072631A. As shown in FIG. 1, this conventional authentication system includes a mobile terminal 1, a base station 2 (referred to as BS 2 hereinafter), an authentication authorization accounting server 3 (referred to as AAA server 3 hereinafter), an access point 4 (referred to as AP 4 hereinafter), a network A 5 (e.g. mobile communication network), and a network B 6 (e.g. wireless LAN network).

The conventional authentication system including this configuration is operated as follows. The BS 2 is connected to the network A 5, and the AP 4 is connected to the network B 6. The AAA server 3 is commonly connected to the network A 5 and the network B 6. The mobile terminal 1 includes a first communication means (e.g. wireless LAN interface) configured to communicate with the AP 4 of the network B 6, and a second communication means (e.g. mobile network interface) configured to communicate with the BS 2 of the network A 5. The mobile terminal 1 includes a means configured to connect to a radio communication channel ensured with high security between the mobile terminal 1 the BS 2 and to transmit data for authentication by using the second communication means when communicating with the network B 6. The AAA server 3 determines whether or not the mobile terminal 1 is allowed to access the AP 4 on the basis of received data for authentication, and notifies the AP 4 of the result.

In access to different communication systems, it is required in the conventional technique to have two different subscriber IDs or a subscriber ID common to each communication system. Furthermore, this subscriber ID needs to be stored in a terminal which is desired to be connected to a communication system, or an IC card which stores a subscriber ID needs to be connected to the terminal and used. Therefore, a terminal which can be used by the user is limited to a terminal which stores the subscriber ID or a terminal connected by the IC card, so that a terminal which can be used by the user is limited.

Conventional techniques will be indicated below, which are related to a technique of a terminal device to access a communication system which requires authentication.

Japanese Laid-Open Patent Application JP2000-197114A discloses a management method of a mobile phone terminal to allow utilization of a communication system by simply switching a subscriber identification device which stores user information in the mobile phone terminal.

Japanese Laid-Open Patent Application JP2002-262360A discloses a technique to send and register a phone number and registered ID data to a mobile phone network by using a mobile phone which is capable of storing registered user ID data and personal data for each user, so as to respond to various subsequent requests with respect to a mobile phone which was authenticated by comparing with registered data.

Japanese Laid-open Patent Application JP2002-288139A discloses a technique in which an authentication server inputs a user ID and a password by proxy when a mobile phone logs in a web server, in a system of performing authentication to log in a website by interposing an authentication server between a mobile phone and a web server.

Japanese Laid-Open Patent Application JP2003-186848A discloses a technique to notify a mobile terminal of an ID and password when an authenticated user registers image data in a distribution server, in which a user connects the mobile terminal to a PC and notifies an data management server of an ID and password stored in the mobile terminal, so that a desired image can be obtained.

Japanese Laid-Open Patent Application JP-A-Heisei, 11-178057 discloses a wireless telephone device to allow communication by sharing a common identifier in wireless base station, and simply registering a slave device in a single wireless base station while being synchronized with the remaining wireless stations.

Moreover, Japanese Laid-Open Patent Application JP-A-Heisei, 8-140141 discloses a technique to deal with a plurality of mobile terminals as a single group, in which an operation by a user of a mobile terminal allows access to a call generated by another mobile terminal within the group, so that a proxy response or the like can be achieved.

DISCLOSURE OF INVENTION

An object of the present invention is to provide an authentication system to allow access to a communication system by a terminal which does not have an access right to the communication system.

An authentication system according to the present invention includes an authentication server, a terminal device which is connected to the authentication server and is authenticated by the authentication server, and a peripheral device which is connected to the terminal device. It is preferable here that the terminal device and the peripheral device are connected to each other by a radio communication channel. The peripheral device accessed by the terminal device transmits identification data for identifying itself to the terminal device, and the terminal device performs a first authentication on the basis of this identification data, and if the terminal device determines that the peripheral device is authenticated, the terminal device transmits authentication data to the authentication server. The authentication server performs a second authentication with respect to the peripheral device by using the authentication data.

The authentication system includes a first communication system which is accessible by the terminal device, and the authentication server is connected to the first communication system, and executes a second authentication for allowing the peripheral device to access the first communication system by using the authentication data transmitted from the terminal device. The peripheral device which was authorized to access in the second authentication can access the first communication system. As described above, the peripheral device which does not have an access right to the first communication system obtains authentication from the terminal device that is accessible via a communication channel, and receives authentication to access the first communication system, so that an access right can be obtained.

It is desirable that the authentication system according to the present invention further includes a personal group management server to be connected to the terminal device via the first communication system. The personal group management server relates the terminal device and the peripheral device which is authorized to access the first communication system, registers and stores it as a personal group list, and transmits the personal group list to the terminal device. As described above, the peripheral device which is authorized to access the first communication system can be managed on the fist communication system side and on the terminal device side.

The authentication server notifies the authenticated peripheral device of a personal group management server address which is an address of the personal group management server, on the basis of authentication data. The peripheral device access the first communication system, and transmits data for identifying the peripheral device and data for identifying the terminal device to the personal group management server on the basis of the personal group management server address. The personal group management server generates the personal group list by relating the data for identifying the peripheral device to the data for identifying the terminal device.

When the peripheral device accesses the terminal device via the communication channel, the peripheral device transmits a peripheral device name which is a name of the peripheral device itself and a peripheral device address which is an address of the peripheral device itself to the terminal device via the communication channel. The terminal device generates the authentication data by using the peripheral device name and the peripheral device address of the peripheral device which is authorized to access the first communication system. The terminal device also relates the authentication data to the peripheral device name and the peripheral device address to identify the peripheral device, and transmit to the peripheral device and the authentication server. The authentication data is thus generated by using peripheral device identification data which is unique to the peripheral device, and sent to the peripheral device and the authentication server, so that authentication to the first communication system is made possible by the authentication data as a one-time password.

The terminal device transmits an address of the authentication server to the peripheral device, and the peripheral device refers to the address of the authentication server to transmit the authentication data added by an peripheral device ID to the authentication server, so that the authentication server performs authentication by referring to the peripheral device ID and comparing stored authentication data with the authentication data received from the peripheral device.

Moreover, when the peripheral device accesses the terminal device via the communication circuit, the peripheral device transmits the first authentication data, the peripheral device name which is the name itself, and the peripheral device address which is the address itself, to the terminal device via the communication circuit, while the terminal device stores the authentication data used for authentication to access the first communication system, and it the authentication data is consistent with the first authentication data in comparison from each other, the terminal device transmits the authentication data to the authentication server.

The terminal device transmits a peripheral device address to the authentication server, while the authentication server refers to the peripheral device address and accesses the peripheral device to obtain the peripheral device name and the authentication data from the peripheral device, so that the authentication server performs authentication by referring to the peripheral device name and comparing the stored authentication data with the authentication data received from the peripheral device.

It is preferable that the authentication system according to the present invention further includes a second communication system which is connected to the first communication system, in which the peripheral device is connected to the second communication system, and authentication to access the first communication system can be received via the second communication system.

As described above, according to the authentication system of the present invention, the terminal (the peripheral device) which has no access right to the communication system (the first communication system) can access the communication system by the terminal (the terminal device) which has the access right.

A handover system according to the present invention includes the authentication system which is configured as described above, and a session control device which is connected to the first communication system. The session control device switches a session between the terminal device and the first communication system to a session between the peripheral device which was authenticated by the second authentication and the first communication system, in response to an connection destination switching request from the terminal device which is communicating with the first communication system.

To be more specific, the terminal device issues the connection destination switching request for changing a connection destination to the peripheral device to the session control device. The session control device which received the connection destination switching request issues a member confirmation signal to the personal group management server. The personal group management server refers to the personal group list in accordance with the member confirmation signal, and personal group management server issues an authentication request to the authentication server it the peripheral device is related to the terminal device. The authentication server authenticates the peripheral device by using the authentication data in response to the authentication request. If it is authenticated in this authentication, the session control device switches the session between the first communication system and the terminal device, to the session between the authenticated peripheral device and the first communication system. As described above, it is possible to switch (handover) connection from the terminal device which is accessing the first communication system, to the peripheral device which has no access right to the first communication system.

It is more preferable that the handover system according to the present invention includes a data distribution server which is further connected to the first communication system and transmits data to the terminal device. The session control device switches the session between the terminal device and the data distribution server to the session between the peripheral device and the data distribution server in response to the connection destination switching request from the terminal device which is receiving data. The data distribution server is thus capable of transmitting data to the peripheral device continuously.

BRIEF DESCRIPTION OF THE DRAWINGS

FIG. 7 is an example of a personal group list according to the present invention.

FIG. 8B is a sequence diagram in the first and second embodiments of the handover system according to the present invention.

FIG. 17B is a sequence diagram of a process during communication in the third embodiment of the handover system according to the present invention.

FIG. 18 is a block diagram at the time of the authentication operation in the third embodiment of the handover system according to the present invention.

BEST MODE FOR CARRYING OUT THE INVENTION

Embodiments of an authentication system according to the present invention will be described by using a handover system as an example which switches a connection destination from a mobile terminal 10 accessible to a mobile network 100, to a PC 20 as a peripheral device.

Embodiments of a handover system according to the present invention will be explained below referring to attached drawings.

First Embodiment

Referring to FIGS. 2 to 11, a first embodiment of a handover system according to the present invention will be explained.

Figure 1:
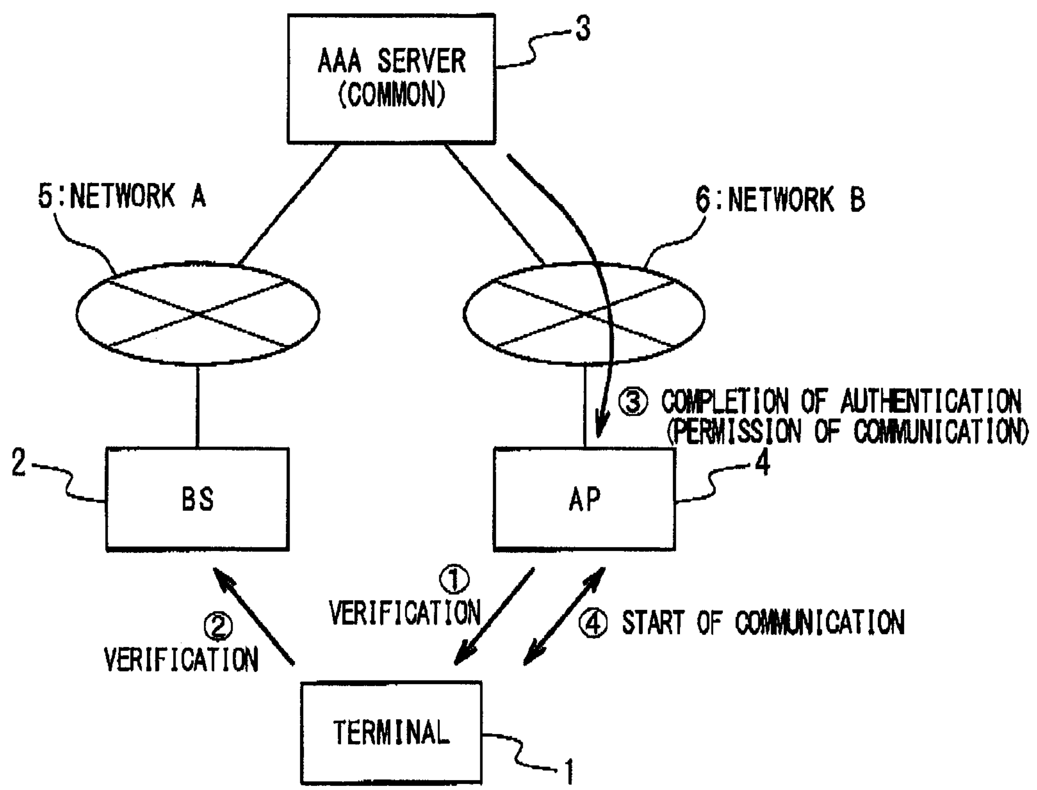
FIG. 1 is a configuration diagram of an authentication system in a conventional example.
Figure 2:
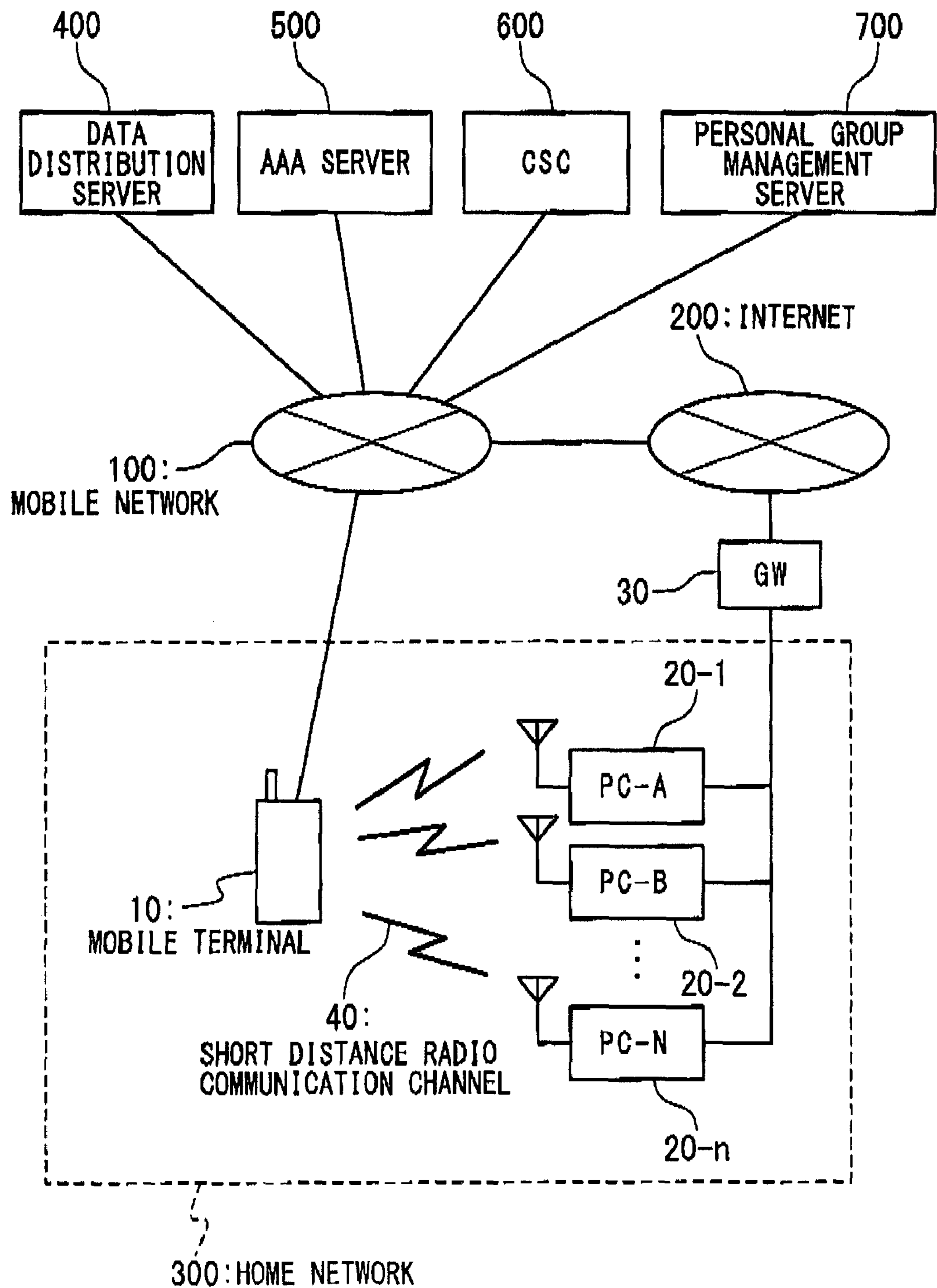
FIG. 2 is a configuration diagram of a handover system according to the present invention.

FIG. 2 is a configuration diagram in this embodiment of the handover system according to the present invention. In the present embodiment, a handover system as an example will be explained in which a distribution destination of motion picture data which is streaming data distributed from a data distribution server 400 is switched from a mobile terminal 10 to a PC (personal computer) 20.

The handover system in the present embodiment includes the data distribution server 400, an AAA (authentication authorization accounting) server 500 as an authentication server, a CSC (call session control) 600 as a session control device, a personal group management server 700, and the mobile terminal 10 as a terminal device, each of which is connected to each other via a mobile network 100 (a first communication system). The Internet 200 (a second communication system) is provided, which is connected to the mobile network 100. A plurality of peripheral devices (PC-A 20-1 to PC-N 20-*n*) is further included, which is connected to the Internet 200 via a GW (gateway) 30. The GW 30 may not be interposed as long as the PC-A 20-1 to PC-N 20-*n* of the peripheral devices are connected to the Internet 200. The Internet 200 may be replaced by a LAN, WAN, and another network as long as it is accessible to the mobile network 100 and the PC 20. Moreover, data transfer in the present embodiment is executed by using an IP address, but an address system is not limited thereto. The mobile terminal 10 and the PC-A 20-1 to PC-N 20-*n* are connected to each other via a short-distance radio communication channel 40, which form an area of the home network 300. Although the plurality of the PC-A 20-1 to PC-N 20-*n* is individually indicated as a PC-A 20-1, PC-B 20-2, . . . , PC-N 20-*n*, it is simply indicated as a PC 20 if distinction is not required to use.

The mobile network 100 is a network which is connected to the Internet 200 and the mobile terminal 10 which is a mobile device such as a mobile phone by a radio communication channel via a base station. The mobile network 100 includes, for example, a mobile phone system utilizing IMT-2000 (international mobile telecommunications 2000) and PDC (personal digital cellular).

The mobile terminal 10 according to the present invention is a device such as a mobile phone and PDA which is accessible to the mobile network 100 by a radio communication channel. A user obtains an authentication ID used for authentication to access the mobile network 100 in advance from a provider or the like which manages the mobile network 100. The mobile terminal 10 accesses the mobile network 100 using this authentication ID, and receives motion picture data from the data distribution server 400 via the mobile network 100. Although the mobile network 100 is used in the present embodiment, a network such as a LAN, wireless LAN, and WAN may also be used as long as it is accessible by the mobile terminal 10. The mobile terminal 10 may also be replaced by a fixed terminal such as a PC, and may be connected to the mobile network 100 by radio communication means, or may be connected to a fixed network such as a LAN.

The PC 20 is a computer device which is connectable to the Internet 200 via the GW 30 such as a home broadband router. The PC 20 may also be replaced by a television, projector and audio equipment or the like as long as being connectable to the Internet 200 and the short-distance radio communication channel 40. In the case of audio equipment, streaming data to be distributed is audio data.

The mobile terminal 10 and the PC 20 have a short-distance radio communication function such as a Bluetooth (registered trademark) in addition to function (radio or wired) to connect the mobile network 100. The mobile terminal 10 and the PC 20 are connected to each other by using this short-distance radio communication function via a communication channel (short-distance radio communication channel 40) in the present embodiment to form the area of the home network 300. The short-distance radio communication channel 40 may also be a wired communication channel such as a USB® and IEEE 1394.

The data distribution server 400 is a server to suitably distribute motion picture data such as stream data to the mobile terminal 10 and the PC 20 via the mobile network 100. In the present embodiment, the data may also be audio data, image data, and a combination of both as long as stream reproduce can be realized. Moreover, the data is not limited to stream data, and may also be file download data or the like.

The AAA server 500 as an authentication server executes authentication, authorization, and charging in order to access the mobile network 100.

The CSC 600 is a device to control a session between End and End, and performs routing of a session message. This session is considered as, for example, an SIP (Session Initiation Protocol) in a third-generation mobile communication system.

The personal group management server 700 generates and stores a personal group list in which the PC 20 authorized to access the mobile network 100 is related to the mobile terminal 10. When a personal group list is generated (renewed), the personal group management server 700 also transmits a renewed personal group list to the mobile terminal 10.

FIG. 7 shows an example of the personal group list. The personal group list is a list to manage the PC 20 in the home network 300 corresponding to each of the mobile terminals 10. In the personal group list, a user data (a terminal identifier) which is a data of a user to use the mobile terminal 10 is related to a peripheral device data which is a data to identify the PC 20 authorized to access the data distribution server, and the list is generated for each user. For example, the user data includes a user ID to identify the user and an IP address of the mobile terminal 10 used by the user. A peripheral device data includes a device name of the PC 20 (peripheral device name) and an IP address of the PC 20 (peripheral device address). The mobile terminal 10 is capable of selecting one from the plurality of the PC-A 20-1 to PC-N **20-*n* accessible via the short-distance radio communication channel 40** and registering it in the personal group list.

Figure 3:
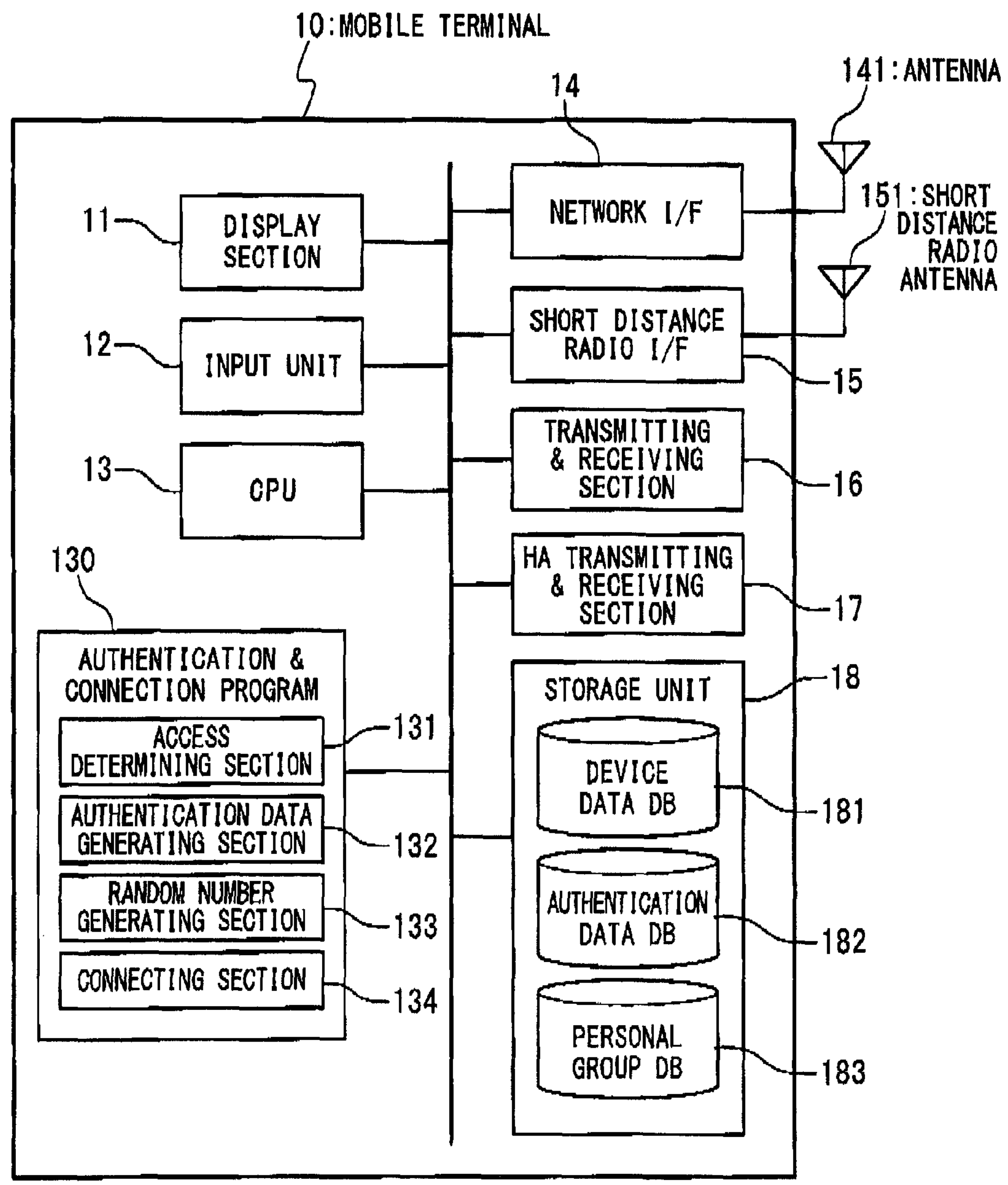
FIG. 3 is a configuration diagram in a first embodiment of a mobile terminal according to the present invention.

Referring to FIG. 3, a configuration of the mobile terminal 10 in the first embodiment will be described. The mobile terminal 10 includes a display section 11, an input unit 12, a CPU 13, a network I/F 14, a short-distance radio I/F 15, a transmitting and receiving section 16, an HA transmitting and receiving section 17, and a storage unit 18, each of which is connected to each other by a communication bus within the mobile terminal 10. The mobile terminal 10 also includes an authentication and connection program 130 which is stored in a storage unit connecting to the CPU 13 by the communication bus.

The CPU 13 executes the authentication and connection program 130 stored in the storage unit. The CPU 13 also processes various kinds of data and signals in the mobile terminal 10. The authentication and connection program 130 is a program stored in the storage unit such as a memory, and includes an access determining section 131, an authentication data generating section 132, a random number generating section 133, and an connecting section 134. The access determining section 131 determines whether or not to authorize access of the PC 20 to the mobile network 100 on the basis of peripheral device data received from the PC 20. The authentication data generating section 132 generates authentication data using the peripheral device data of the PC 20 which was authorized to access by the access determining section 131. The random number generating section 133 generates a random number used for generating the authentication data. The connecting section 134 issues an connection destination switching command for switching connection to the PC 20 registered in a personal group list, and processes switching of an connection destination.

A command from the CPU 13 causes the transmitting and receiving section 16 to execute a control of transmission and reception of various kinds of data and signals to/from the mobile network 100. The network I/F 14 is an interface to communicate with the mobile network 100, in which format conversion and modulation are made for various kinds of data and signals sent from the transmitting and receiving section 16 so as to transmit to the mobile network 100 via an antenna 141. Modulation and format conversion are also made for various kinds of data and signals received from the mobile network via the antenna 141.

When the mobile terminal 10 enters an area of the home network 300 which is a zone within the short-distance radio communication channel, the HA transmitting and receiving section 17 receives peripheral device data from the PC 20 via the short-distance radio I/F 15. The HA transmitting and receiving section 17 also transmits authentication data generated by the authentication data generating section to the PC 20. The short-distance radio I/F 15 is an interface to communicate with the PC 20 via the short-distance radio communication channel 40, in which communication is made with the PC 20 in the area of the home network 300 via a short-distance radio antenna 151 through format conversion and modulation of various kinds of data and signals.

The storage unit 18 is a storage unit such as a writable memory which cannot be used by being detached, and a detachable memory into which data can be written exclusively by the mobile terminal 10, and includes a device data database (device data D/B) 181, an authentication data database (authentication data D/B) 182, and a personal group database (personal group D/B) 183.

The device data D/B 181 stores peripheral device data of the PC 20 which was authorized to access the mobile network 100. The peripheral device data is registered in advance from the input unit 12 by a user of the mobile terminal 10, and unique data of the PC 20 in which a peripheral device name as a name of the PC 20 is related to a peripheral device address as an IP address of the PC 20 for example.

The authentication data generated in the authentication data generating section 132 is related to a peripheral device ID as a temporary ID to identify the PC 20 corresponding thereto and stored in the authentication data D/B 182.

The personal group D/B 183 stores, as a personal group list (see FIG. 7), peripheral device data related to the mobile terminal 10 itself received from the personal group management server 700 via the mobile network 100, i.e. a peripheral device name and a peripheral device address of the PC 20 in the home area network 300.

The display section 11 displays motion picture data received in the transmitting and receiving section 16 by stream reproduction. The display section 11 also displays access authorization data such as the peripheral device name of the PC 20 authorized to access in the access determining section 131.

Figure 4:
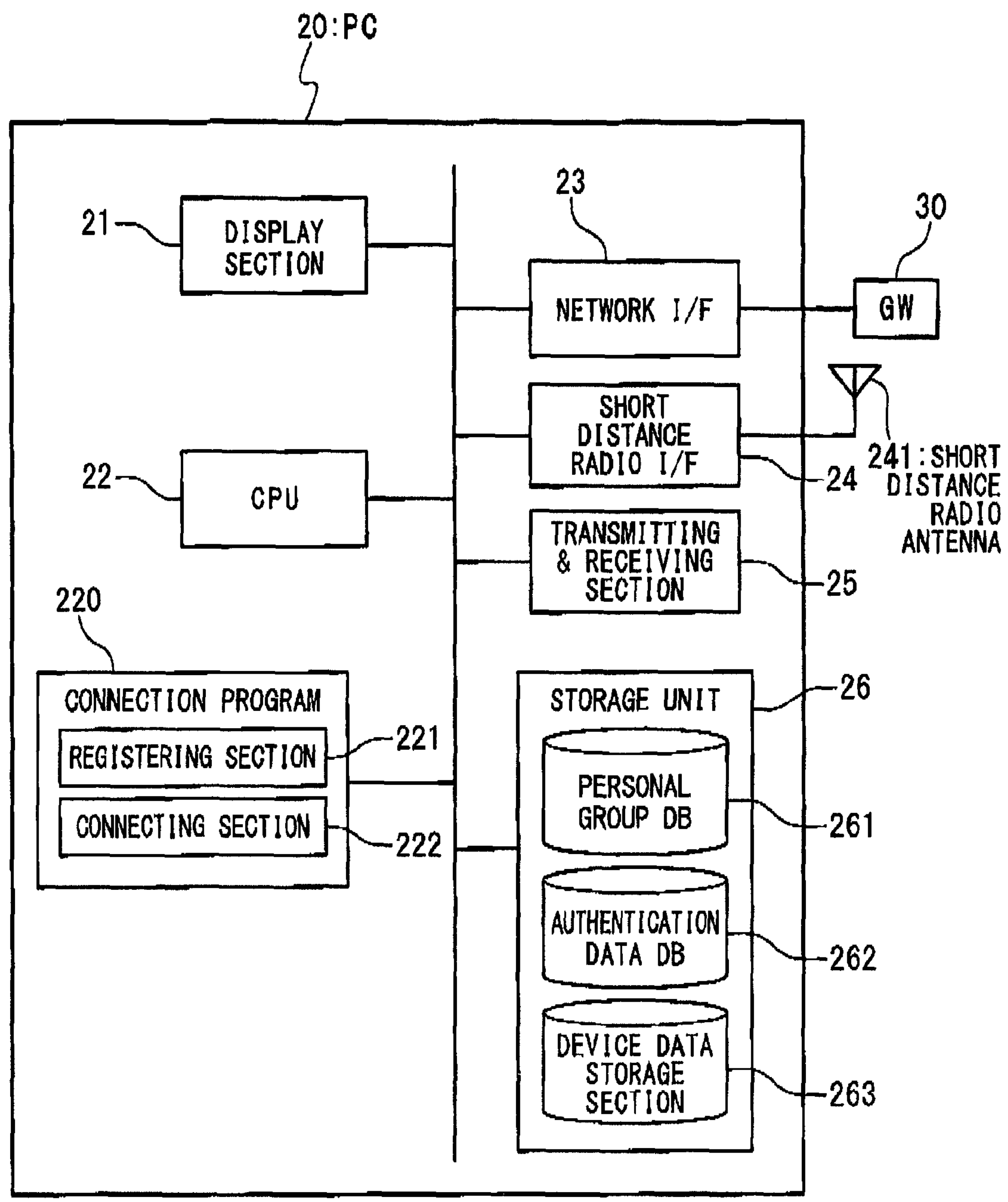
FIG. 4 is a configuration diagram in first and second embodiments of a PC according to the present invention.

FIG. 4 is a configuration diagram of the PC 20. The PC 20 includes a display section 21, a CPU 22, a network I/F 23, a short-distance radio I/F 24, a transmitting and receiving section 25, and a storage unit 26.

The display section 21 displays motion picture data received from the data distribution server 400 by streaming reproduction. The CPU 22 executes a process in a connection program 220. The CPU 22 also processes various kinds of data and signals in the PC 20. The connection program 220 is a program stored in a storage unit such as a memory, including a registration section 221 and a connecting section 222. The registration section 221 executes a process of registering into a personal group, and a process for authentication. The connecting section 222 executes a process to access the data distribution server 400 via the mobile network 100.

The short-distance radio I/F 24 is an interface to communicate with the mobile terminal 10 in the area of the home network 300 via a short-distance radio antenna 241 by performing format conversion and modulation of various kinds of data and signals sent from the transmitting and receiving section 25.

The transmitting and receiving section 25 controls transmission and reception of various kinds of data and signals to be transmitted to and received from the short-distance radio communication channel 40 and the mobile network 100 from the CPU22.

The network I/F 23 is an interface which is connected to the GW 30, and communicates with each of the devices connected to the mobile network 100 via the Internet 200 by converting a format used in various kinds of data and signals sent from the transmitting and receiving section.

The storage unit 26 is a storage unit such as a hard disc drive and memory, including a personal group database (personal group D/B) 261, an authentication data database (authentication data D/B) 262, and a device data storage section 263.

The personal group D/B 261 stores an IP address of the personal group management server 700 (a personal group management server address) received via the network I/F 23.

The authentication data D/B 262 stores authentication data received from the mobile terminal 10 via the short-distance radio communication channel 40, an ID of the user who owns the mobile terminal 10, and a peripheral device ID as a temporary ID, in association with one another. The device data storage section 263 stores the peripheral device data of the PC 20 itself which includes a peripheral device name and an IP address (peripheral device address) of the PC 20.

Figure 5:
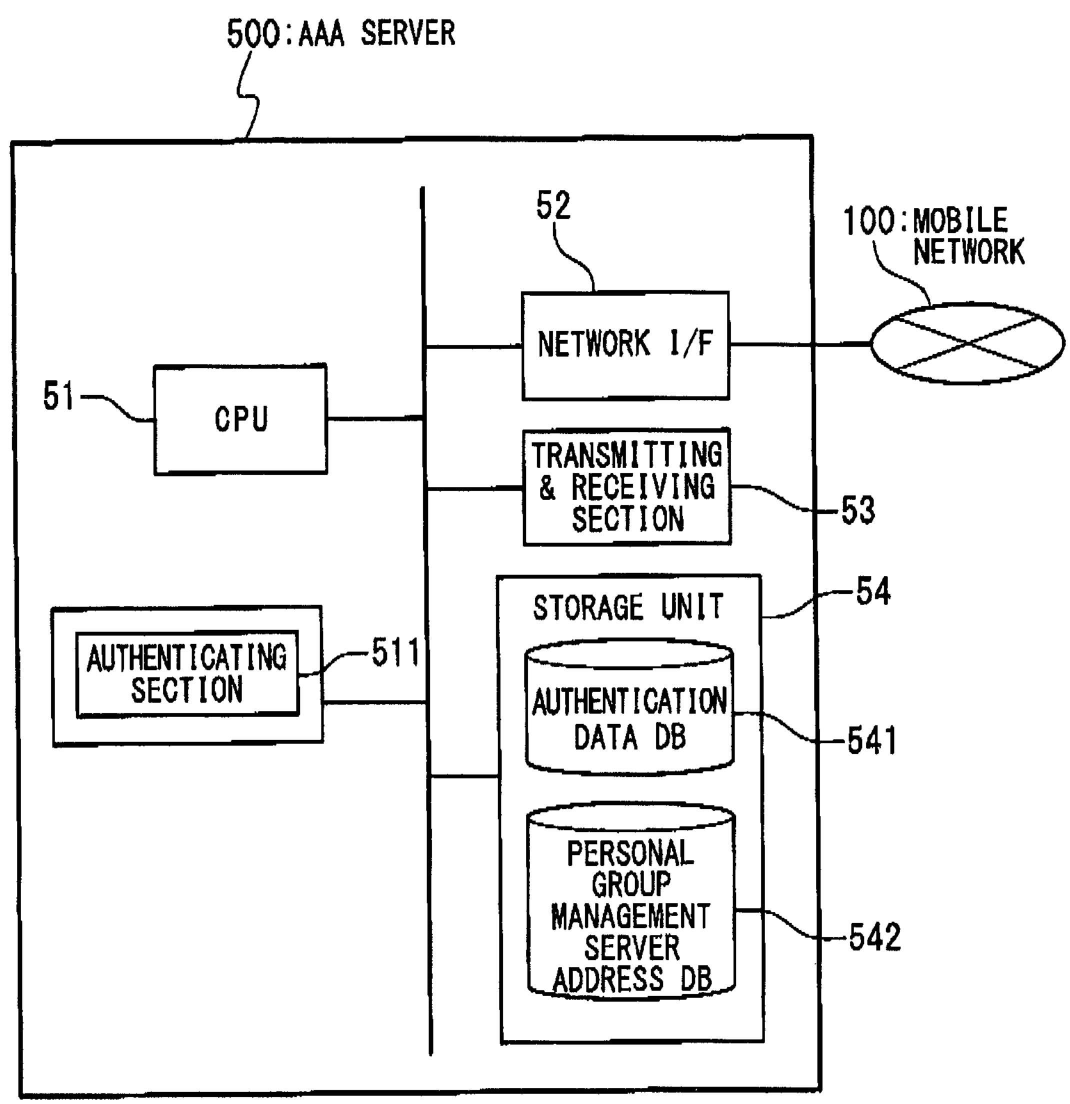
FIG. 5 is a configuration diagram of an AAA server according to the present invention.

Referring to FIG. 5, a configuration of the AAA server 500 will be described. The AAA server 500 includes a CPU 51, a network I/F 52 which is an interface to communicate to the mobile network 100, a transmitting and receiving section 53, and a storage unit 54.

The CPU 51 executes an authentication process of an authentication section 511 which authenticates a mobile terminal to access the mobile network 100. The CPU 51 also processes various kinds of data and signals in the AAA server 500. The authentication section 511 is a program stored in a storage unit such as a memory and hard disc drive, and stores authentication data received from the mobile terminal 10, a peripheral device address, and a peripheral device ID in association with one another in an authentication data D/B 541. The authentication section 511 also extracts authentication data which corresponds to a peripheral device ID received from the PC 20, from the authentication data D/B 541 in order to execute an authentication process by comparing with the authentication data received from the PC 20.

The transmitting and receiving section 53 controls various kinds of signals and data sent to or received from each of the devices accessed to the mobile network 100 by a command from the CPU 51.

The storage unit 54 is a storage unit such as a hard disc drive and memory, including the authentication data D/B 541 and a personal group management server address D/B 542. The authentication data received from the mobile terminal 10 and the peripheral device ID of the PC 20 as an authentication subject are related and stored in the authentication data D/B 541. The personal group management server address D/B 542 stores an IP address of the personal group management server 700.

Figure 6:
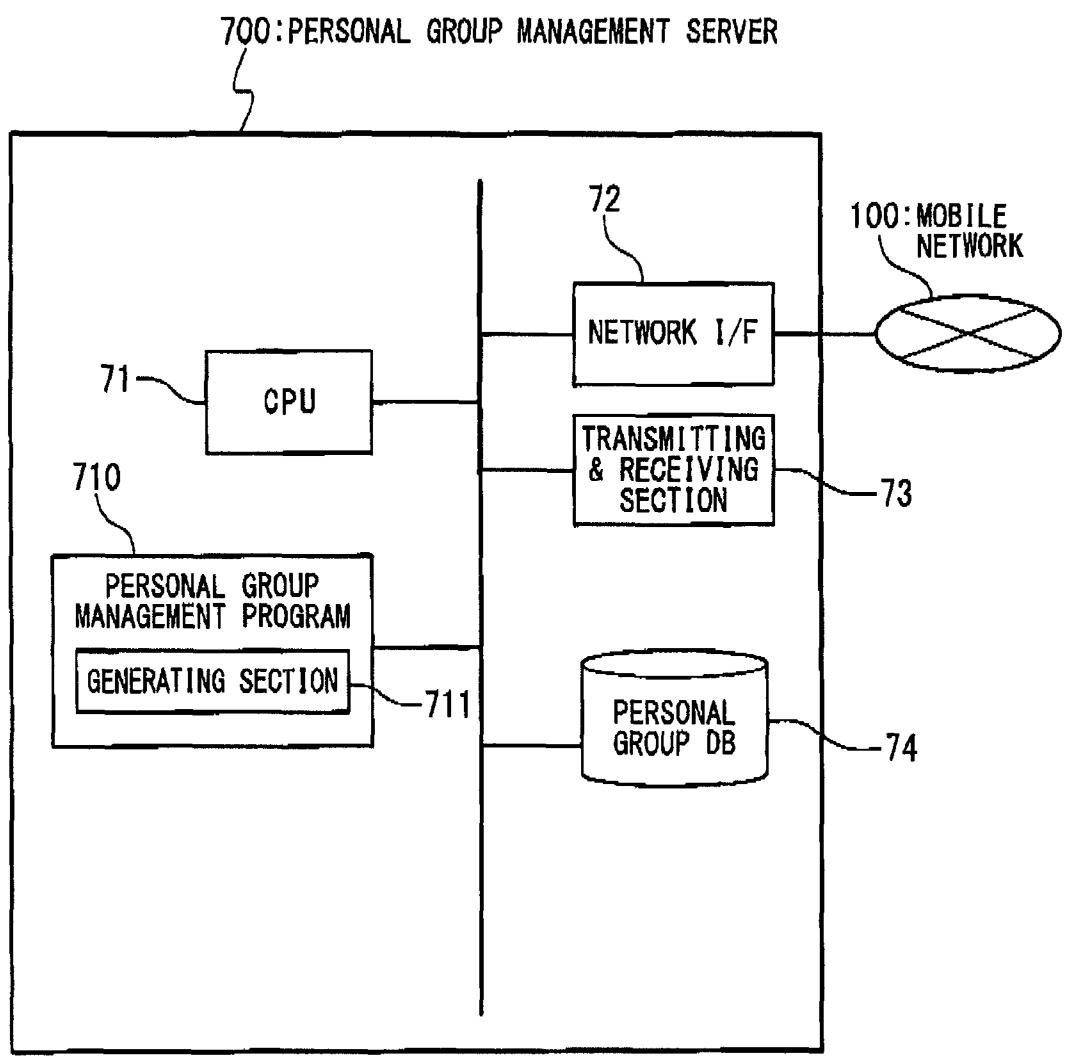
FIG. 6 is a configuration diagram in the first and second embodiments of a personal group management server according to the present invention.

Referring to FIG. 6, a configuration of the personal group management server 700 will be described. The personal group management server 700 includes a CPU 71, a network I/F 72 which is an interface to communicate to the mobile network 100, a transmitting and receiving section 73, and a personal group D/B 74.

The CPU 71 executes a process related to generate a personal group list and confirm registration in a personal group management program 710. The CPU 71 also processes various kinds of data and signals in the personal group management server. The personal group management program 710 is a program stored in a storage unit such as a hard disc drive and memory, including a generating section 711. The generating section 711 uses peripheral device data and user data (possibly a terminal identifier) received from the PC 20, in order to generate the personal group list corresponding to the user data. The generated personal group list is stored in the personal group D/B 74, and transmitted to the mobile terminal 10 which is a request source of switching a data distribution destination.

The transmitting and receiving section 73 controls various kinds of signals and data sent to and received from each of the devices accessed to the mobile network 100 by a command from the CPU 71. The personal group D/B stores a personal group list generated in the generating section 711.

Figure 8A:
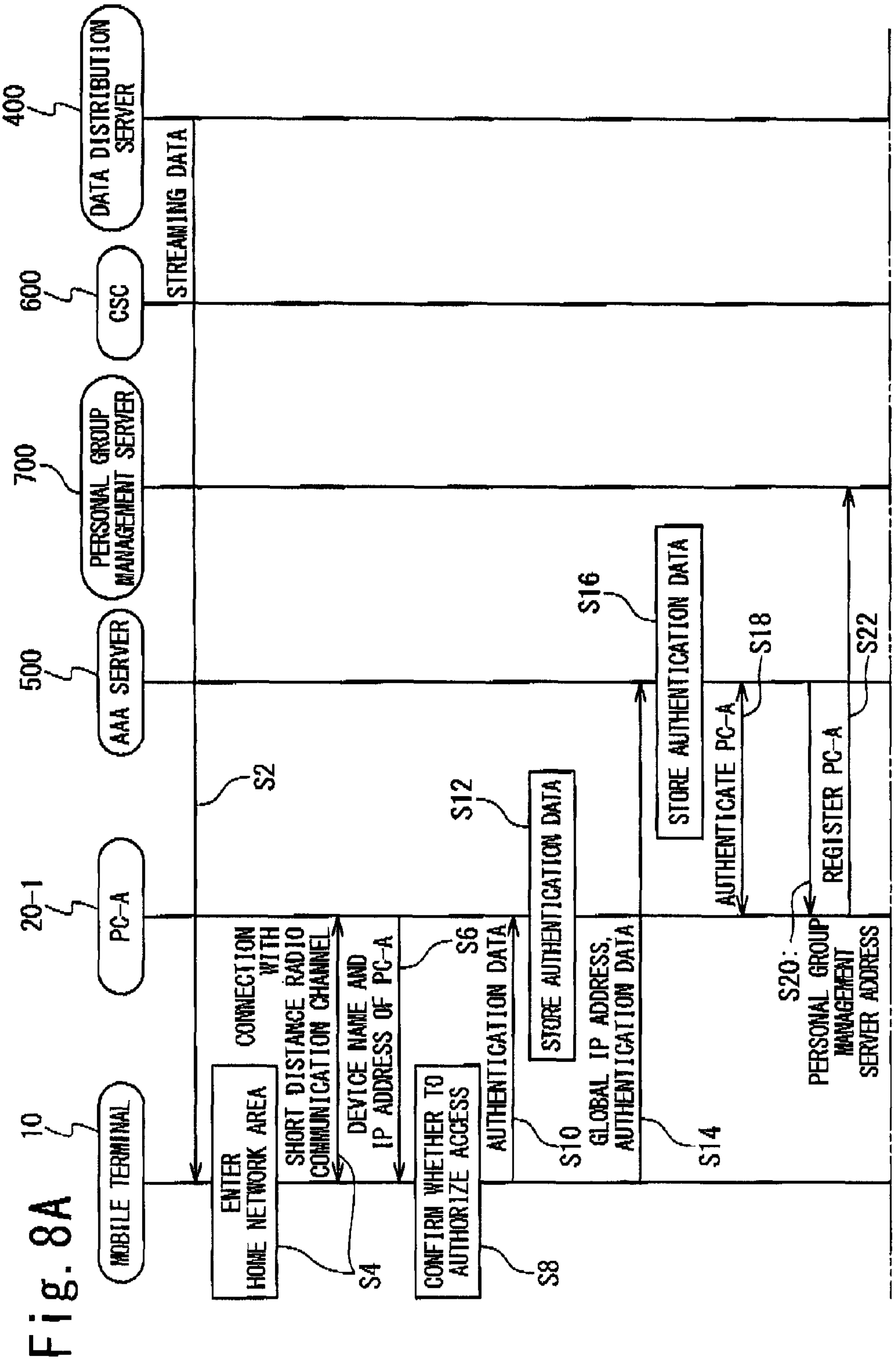
FIG. 8A is a sequence diagram in the first and second embodiments of the handover system according to the present invention.
Figure 9:
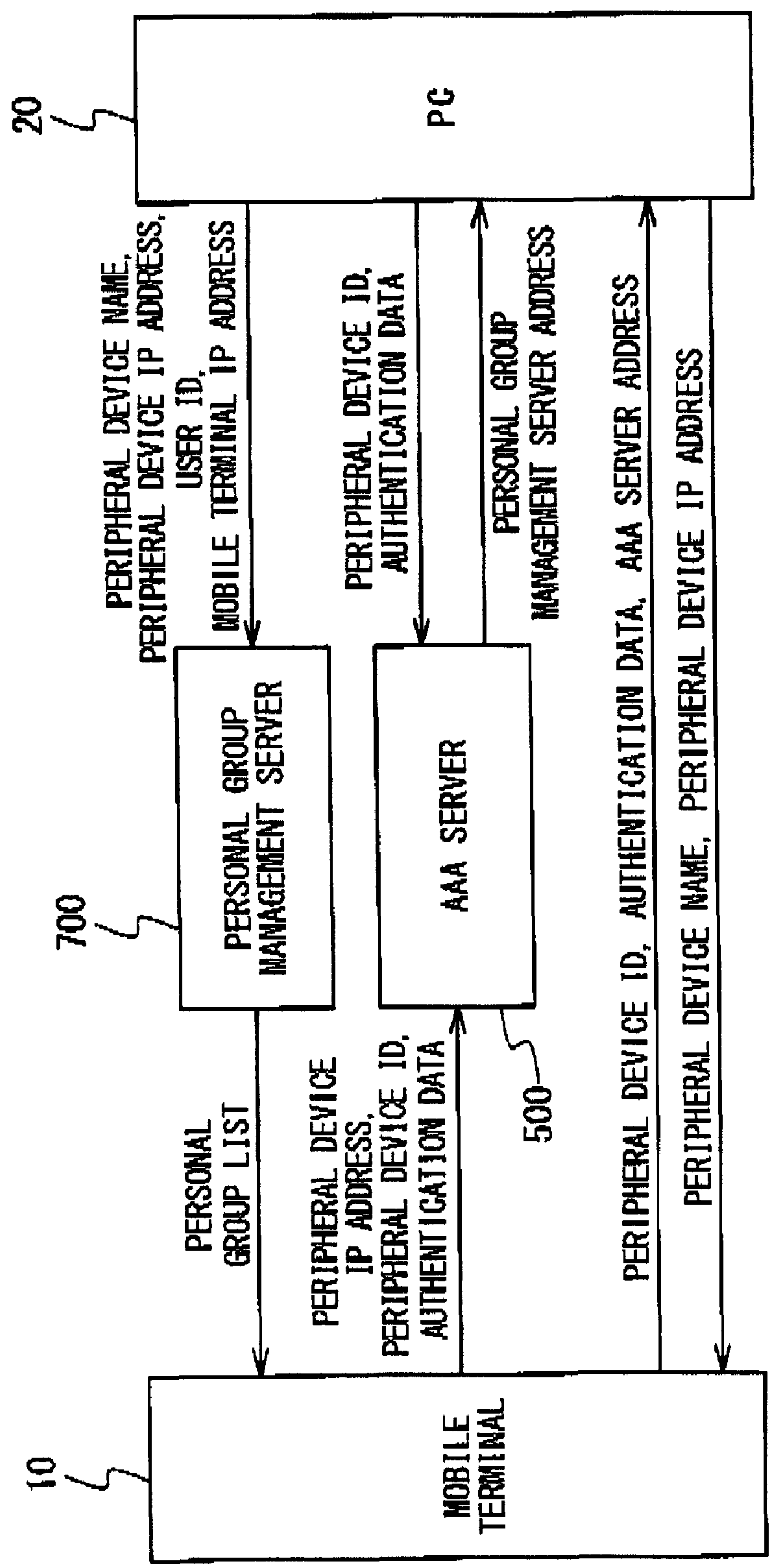
FIG. 9 is a block diagram at the time of an authentication operation in the first and second embodiments of the handover system according to the present invention.

In the first embodiment, a distribution destination of motion picture data is switched to the PC 20 which is authorized to access the mobile network among the PC 20 accessible to the mobile terminal 10 when the mobile terminal 10 enters the area of the home network 300. FIGS. 8A and 8B are sequence diagrams showing an operation of a handover process in the first embodiment. FIG. 9 is a block diagram showing an authentication operation in the present embodiment. The handover process in the first embodiment will be explained below using an example of an operation of receiving motion picture data from the data distribution server 400 and switching a distribution destination of the motion picture data from the mobile terminal 10 which is performing streaming reproduction to the PC-A 20-1, with reference FIGS. 8A, 8B and 9.

When the mobile terminal 10 which is receiving motion picture data enters the area of the home network 300 in step S2, the mobile terminal 10 performs a process to connect to the PC-A 20-1 through PC-N **20-*n* in the area of the home network 300** via the short-distance radio communication channel (step S4).

When a link is established via the short-distance radio communication channel 40, the registration section 221 in each of the PC-A 20-1 through PC-N 20-*n* transmits peripheral device data including a peripheral device name and a peripheral device address to the mobile terminal 10 via the short-distance radio communication channel 40 (step S6). The mobile terminal 10 compares the peripheral device data with device data stored in the device data D/B 181 in order to determine whether or not to authorize access (step S8). When the PC-A 20-1 is determined as a peripheral device authorized to access, the mobile terminal 10 generates authentication data and relates a peripheral device ID as a temporary ID to an IP address of the AAA server 500, so as to transmit to the PC-A 20-1 (step S10).

The mobile terminal 10 relates the authentication data, the peripheral device ID, and a peripheral device address of the PC-A 20-1 to one another, and transmits them to the AAA server 500 via the mobile network 100 (step S14). At this time, if the peripheral device address is a private IP address, the PC-A 20-1 obtains a global IP address from the GW 30 in advance, so that the PC-A 20-1 transmits the global IP address as the peripheral device address to the mobile terminal 10, and the mobile terminal 10 transmits the global IP address as the peripheral device address to the AAA server 500.

Figure 10:
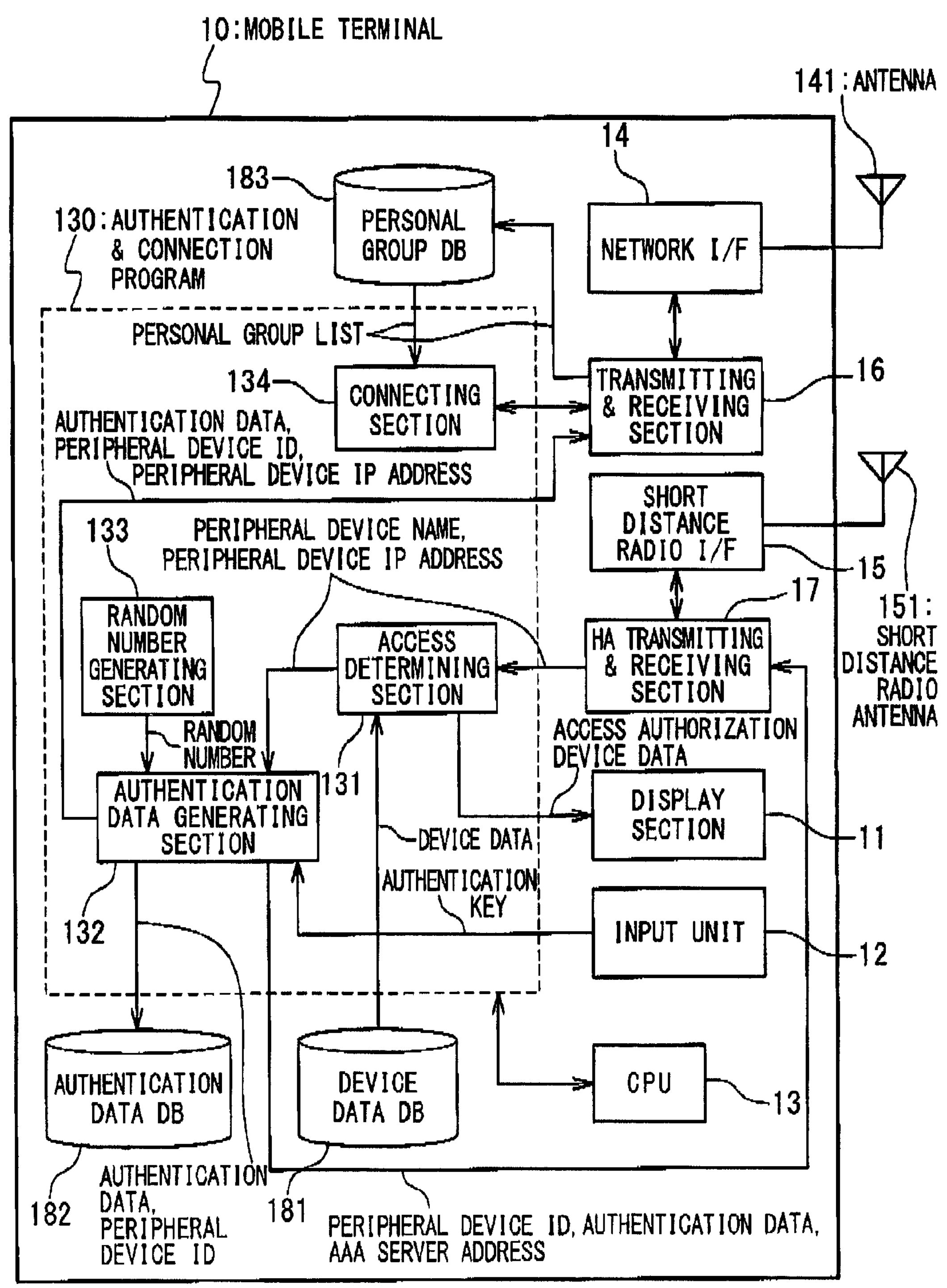
FIG. 10 is a block diagram at the time of the authentication operation in the first embodiment of the mobile terminal according to the present invention.

An operation from entering to the area of the home network 300 (step S4) to providing authentication data (step S14) in the mobile terminal 10 will be explained with reference to FIG. 10 and FIG. 11.

When the mobile terminal 10 enters the area of the home network 300, the HA transmitting and receiving section 17 detects the PC-A 20-1 through PC-N 20-*n* in the area of the home network 300 via the short-distance radio communication channel. The HA transmitting and receiving section 17 performs a process to connect to the detected PC-A20-1 through the PC-N20-*n* via the short-distance radio communication channel (step S102).

A peripheral device name and a peripheral device address acquired from the PC-A 20-1 through PC-N 20-*n* via the short-distance radio I/F 15 are sent from the HA transmitting and receiving section 17 to the access determining section 131 (step S104). The access determining section 131 compares peripheral device data acquired from the respective PC 20 with peripheral device data stored in the device data D/B 181 in order to determine whether or not to authorize access (step S106). The PC 20 is determined that the access is not authorized if peripheral device data to be consistent with acquired peripheral device data does not exist, while peripheral device data of the PC 20 including a peripheral device name and a peripheral device address is sent to the authentication data generating section 132 if the consistent data exists. At this time, profile data indicating a determination reference may be prepared in the device data D/B 181 in advance, and used to determine whether or not to authorize access. Moreover, peripheral device data of the PC 20 which was authorized to access is sent to the display section 11 and displayed therein. A user is capable of confirming an accessible peripheral device name displayed in the display section 11.

When the user confirms the PC 20 which is accessible to the mobile network 100, the user operates the input unit 12 to select the PC 20, e.g. the PC-A 20-1, as a distribution switching destination of the motion picture data while inputting an authentication key. A peripheral device name specified by the input unit 12, and a peripheral device address corresponding thereto are supplied to the authentication data generating section 132. An authentication key inputted from the input unit 12 is also supplied to the authentication data generating section 132. Furthermore, the random number generating section 133 generates a random number which is supplied to the authentication data generating section 132. The authentication data generating section 132 generates authentication data using the supplied peripheral device name, peripheral device address, authentication key and random number, so as to store in the authentication data D/B 182 by relating to a peripheral device ID as a temporary ID (step S108).

Moreover, the transmitting and receiving section 16 transmits the authentication data, the peripheral device ID and the peripheral device address to the AAA server 500 on the mobile network 100 via the network I/F 14 by a transmission request from the authentication data generating section 132. The HA transmitting and receiving section 17 further transmits the authentication data, the peripheral device ID and an IP address 913 of the AAA server 500 to the PC-A 20-1 via the short-distance radio I/F (step S112).

Referring to FIG. 8, the registration section 221 of the PC-A 20-1 stores the authentication data, the peripheral device ID, and the IP address 913 of the AAA server 500 that were received from the mobile terminal 10 in association with one another in the authentication data D/B 262 (step S12). The authentication section 511 of the AAA server 500 stores the received authentication data, the peripheral device address, and the peripheral device ID in association with one another in the authentication data D/B 541 (step S16). The authentication section 511 issues an authentication data request signal to the PC-A 20-1 via the mobile network 100 and the Internet 200 on the basis of the peripheral device address stored in the authentication data D/B 541, and starts an authentication process (step S18). The registration section 221 of the PC-A 20-1 extracts the authentication data and the peripheral device ID from the authentication data D/B 262 on the basis of the received authentication data request signal, so as to transmit to the AAA server 500 via the network I/F 23. The authentication section 511 of the AAA server 500 extracts the authentication data corresponding to the peripheral device ID which was received from the PC-A 20-1, from the authentication data D/s 541 so as to execute the authentication process by comparing with the authentication data received from the PC-A 20-1.

If the PC-A 20-1 is authenticated as a legitimate terminal, the authentication section 511 of the AAA server 500 extracts an IP address 908 of the personal group management server 700 corresponding to the data distribution server 400 from the personal group management server address D/B 542, so as to transmit to the PC-A 20-1 (step S20).

The registration section 221 of the PC-A 20-1 transmits the peripheral device data of the PC-A 20-1 including the peripheral device name and the peripheral device address, the user ID, and a terminal device address of the mobile terminal 10 to the personal group management server 700 via the Internet 200 and the mobile network 100 on the basis of the received IP address of the personal group management server (step S22). The received IP address of the personal group management server is also stored in the personal group D/B 26 (step S24).

The generating section 711 of the personal group management server 700 generates a personal group list for each user from the peripheral device data (the peripheral device name and the peripheral device address) and the user ID received from the PC-A 20-1 (step S26). At this time, if the personal group list of the user ID exists already, the personal group data are updated by adding new peripheral device data to peripheral device data of the personal group list. The transmitting and receiving section 73 also transmits the generated personal group list to the mobile terminal 10 via the mobile network

100 on the basis of the IP address of the mobile terminal 10 corresponding to the user ID (step S28).

The transmitting and receiving section 16 of the mobile terminal 10 stores the received personal group list and a name of the mobile network 100 to be accessible in association with one another in the personal group list D/B 17 (step S30). The personal group list is displayed in the display section 11, so that the user is capable of confirming the updated personal group list. The mobile terminal 10 repeats the operations from the step S6 through the step S30, so that the PC 20 which is authorized to access the mobile network 100 out of the PC-B 20-2 through PC-N 20-*n* in the area of home network 300 can be registered in the personal group list.

The user selects a distribution switching destination of the motion picture data by using the input unit 12 from the PCs 20 registered in the personal group list (PC-A 20-1 is selected here). The connecting section 134 issues a switching request signal to the PC-A 20-1 via the short-distance radio communication channel (step S32). At this time, an IP address of the data distribution server 400 and a Call-ID of an SIP associated with motion picture data which is streaming data are transmitted to the PC-A 20-1 as session data, A Call-ID is an identifier to identify each session. When the switching request signal is received, the connecting section 222 of the PC-A 20-1 refers to the IP address of the AAA server 500, so as to transmit the authentication data and the peripheral device ID to the AAA server 500. The authentication section 511 of the AAA server 500 extracts the authentication data corresponding to the received peripheral device ID from the authentication data storage unit 54, and executes an authentication process by comparing with authentication data received from the PC-A 20-1 (step S34).

If the PC-A 20-1 is authenticated as a legitimate terminal, the connecting section 222 of the PC-A 20-1 accesses the mobile network 100 via the Internet 200 (step S36), and accesses the data distribution server by using the notified session data (step S37). The data distribution server 400 specifies a session of streaming data used by the mobile terminal 10 from the notified session data, and adds the PC-A 20-1 as a new distribution destination of the session (step S38). When these processes are completed, the connecting section 222 of the PC-A 20-1 issues the switching authorization signal to the mobile terminal 10 via the short-distance radio communication channel (step S40).

When the switching authorization signal is received, the SIP session of streaming data between the mobile terminal 10 and the data distribution server 400 is disconnected (BYE/200 OK). The connecting section 134 of the mobile terminal 10 which received the switching authorization signal also causes the display section 11 to display switching completion. The data distribution server 400 continuously distributes the motion picture data to the PC-A 20-1 (step S42).

As described above, by using the peripheral device data obtained from the PC 20 which has no access right to the mobile network 100, the authentication data for accessing the mobile network 100 can be generated and consequently, the PC 20 can be allowed to have an access right. At this time, it is confirmed by the mobile terminal 10 whether or not to authorize access, while the authentication data is generated by using the authentication key and the peripheral device data, so that the authentication data with high security can be prepared.

Moreover, when the user exits the area of the home network 300 and the short-distance radio communication channel is disconnected, the mobile terminal 10 deletes the PC-A 20-1 through PC-N 20-*n* from the personal group list, which is notified to the AAA server 500 and the personal group management server 700. As a result, the AAA server 500 deletes the authentication data of the PC-A 20-1 through PC-N 20-*n*. The personal group management server 700 also deletes the PC-A 20-1 through PC-N 20-*n* from a personal group list. Furthermore, the mobile network connection by the PC-A 20-1 through the PC-N 20-*n* is disconnected. When the mobile terminal 10 exits from the area of the home network 300, i.e. when the connection to the PC 20 of the data distribution switching destination is disconnected, the data distribution to the PC 20 can be suspended. Therefore, it is possible to suppress an illegal use such as receiving data distribution by a person other than the user.

In the present embodiment, it is possible for the user (the mobile terminal 10) which entered the area of the home network 300 to utilize a service on the mobile network 100 by using the PC 20 which does not store subscriber ID data, and the handover process to switch a session which is being communicated in the mobile terminal 10 to the PC 20 can be realized. Therefore, the distribution destination of the motion picture data which is streaming data can be changed from the mobile terminal 10 to the PC-A 20-1 seamlessly, so that the motion picture which was subjected to streaming reproduction in the mobile terminal 10 can be continuously watched by the user in the display section 21 of the PC-A 20-1.

Second Embodiment

A second embodiment of the handover system according to the present invention will be explained next referring to FIG. 2 and FIGS. 11 to 13. A configuration element having the reference letter same as that in the first embodiment, is configured and operated in the same manner, so that explanation thereof will be omitted.

Referring to FIG. 2, the hand over system in the second embodiment is configured to include a mobile terminal 10' in place of the mobile terminal 10 in the first embodiment.

Figure 12:
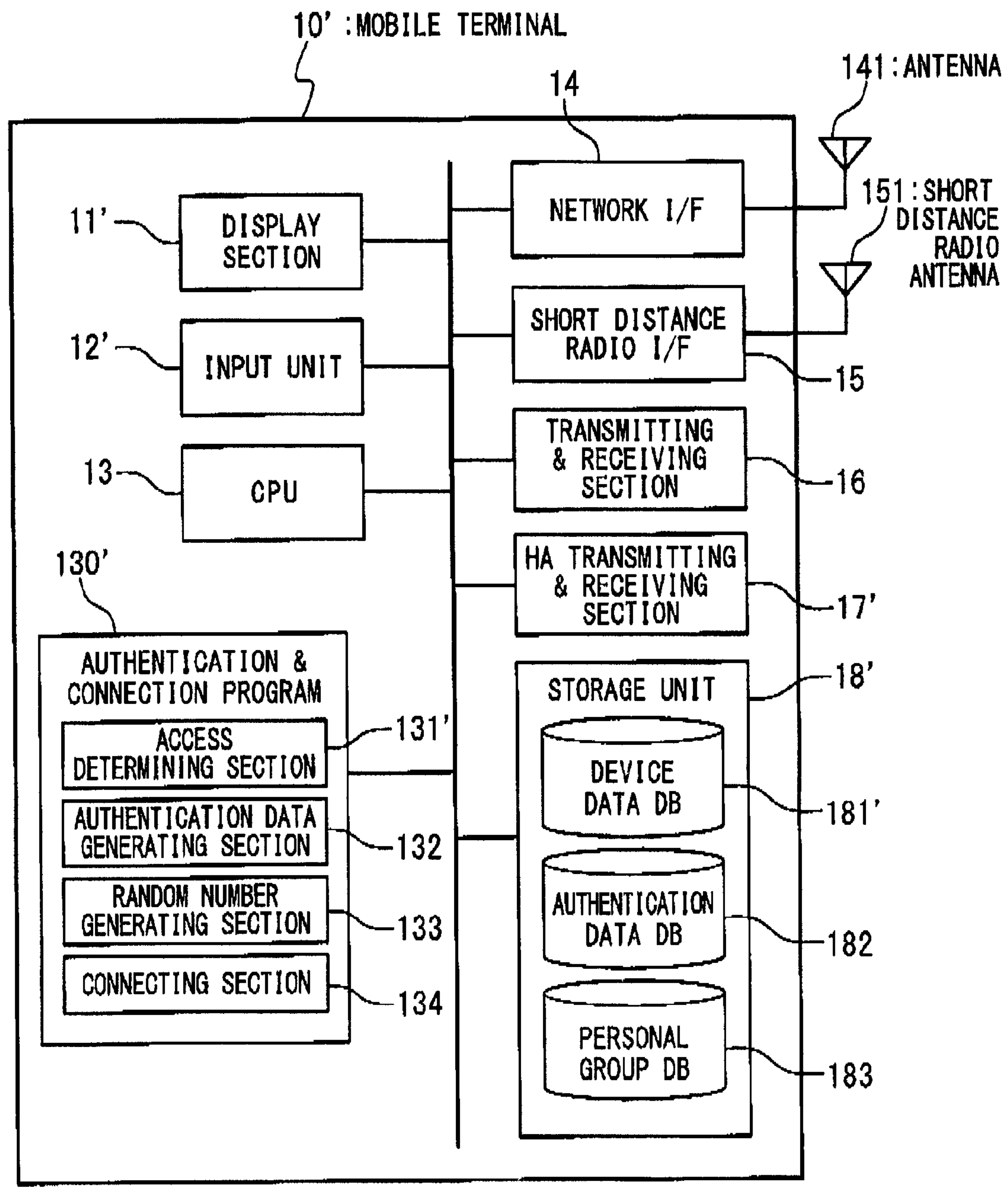
FIG. 12 is a configuration diagram in the second embodiment of the mobile terminal according to the present invention.

Referring to FIG. 12, a configuration of the mobile terminal 10' will be described. The mobile terminal **10*f* is configured to include a display section 11', an input unit 12', the CPU 13, an authentication and connection program 130', the network I/F 14, the short-distance radio I/F 15, the transmitting and receiving section 16, an HA transmitting and receiving section 17', and a storage unit 18', each of which is connected to each other by a communication bus within the mobile terminal 10'**.

The display section 11' displays a peripheral device name and a peripheral device address received from the PC 20 via the short-distance radio communication channel 40. The input unit 12' sends a selection signal for extracting peripheral device data corresponding to a selected peripheral device name to an access determining section 131' by an operation from the user. Moreover, in generating authentication data, an authentication key inputted by the user is transmitted to the authentication data generating section 132.

The authentication and connection program 130' includes the access determining section 131' in place of the access determining section 131 in the first embodiment. The access determining section 131' extracts peripheral device data from a device data D/B 181' by the selection signal from the input unit 12', so as to transmit to the authentication data generating section 132.

When the mobile terminal 10' enters the area of the home network 300 which is the zone within the short-distance radio communication channel, the HA transmitting and receiving section 17' receives peripheral device data from the PC 20 via the short-distance radio I/F 15, and transmits the peripheral device data to the display section 11' and the device data D/B 181'. The HA transmitting and receiving section 17' also transmits authentication data generated in the authentication data generating section to the PC 20.

The storage unit 18' includes the device data D/B 181' in place of the device data D/B 181 in the first embodiment. In the device data D/B 181', a peripheral device name and a peripheral device address of the PC 20 received from the PC 20 itself via the short-distance radio communication channel 40 are related and stored.

Figure 11:
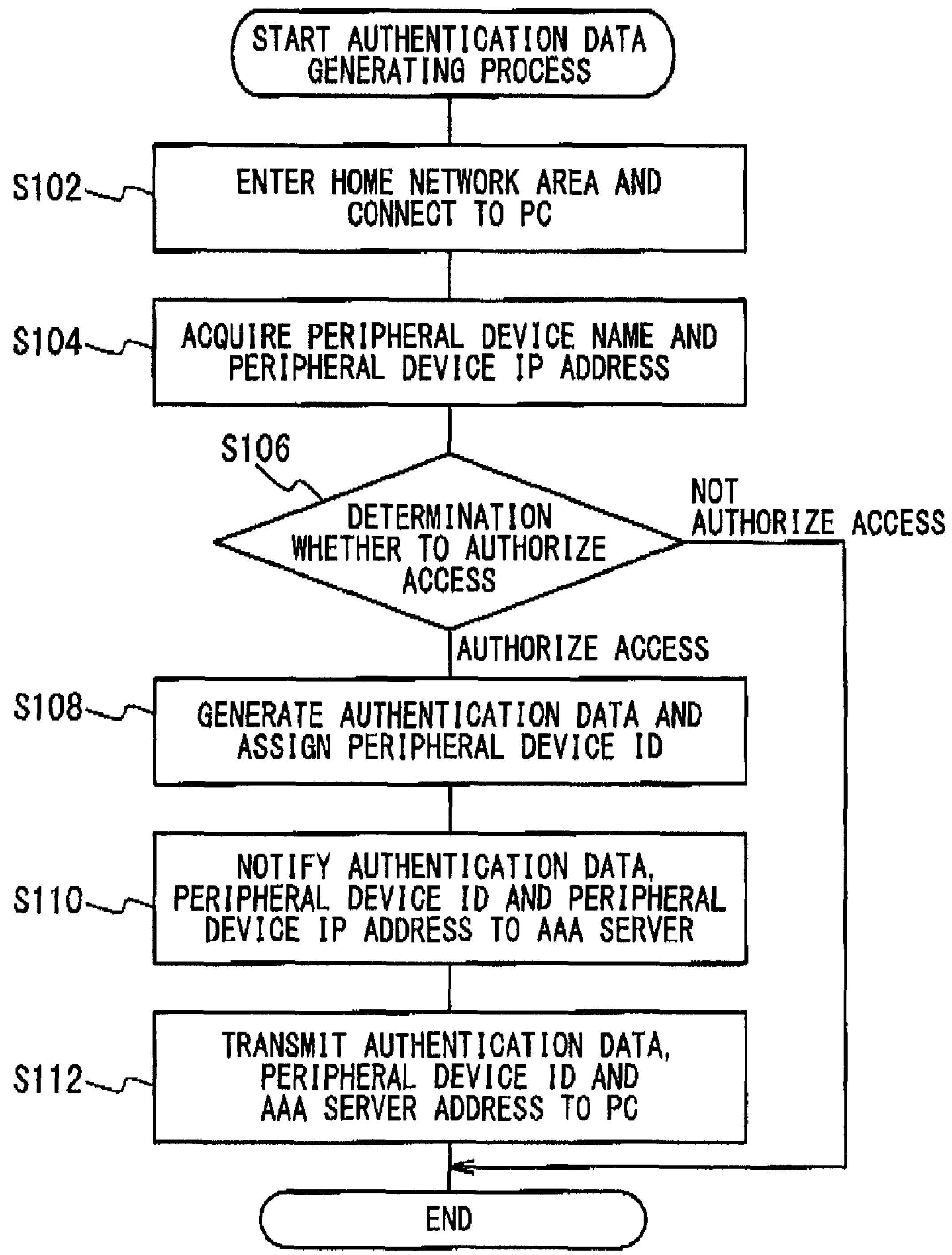
FIG. 11 is a flowchart of an authentication data generation process in the first and second embodiments of the mobile terminal according to the present invention.
Figure 13:
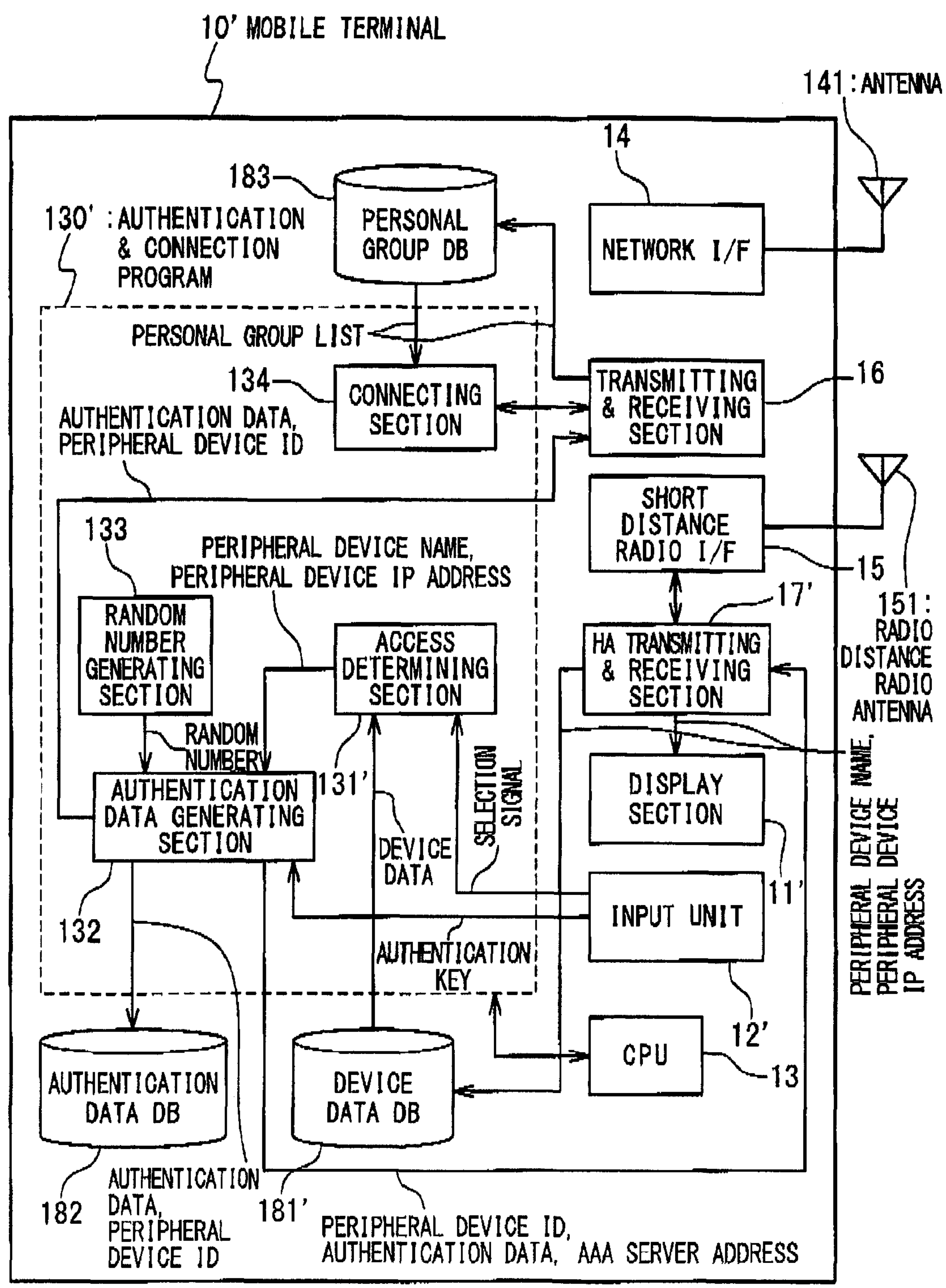
FIG. 13 is a block diagram at the time of the authentication operation in the second embodiment of the mobile terminal according to the present invention.

Referring to FIGS. 11 to 13, an operation in an authentication data generation process in the handover system according to the second embodiment will be explained. Since operations except for the operation in the authentication data generation process in the handover system according to the second embodiment are the same as the operations in the first embodiment, explanation thereof will be omitted.

An operation from entering the area of the home network 300 (step S4 in FIG. 8A) to providing authentication data (step S14 in FIG. 8A) in the mobile terminal 10' will be explained referring to FIGS. 11 to 13.

When the mobile terminal 10' enters the area of the home network 300, the HA transmitting and receiving section 17 detects the PC-A 20-1 through PC-N 20-*n* in the area of the home network 300 via the short-distance radio communication channel. The HA transmitting and receiving section 11' performs a process to connect to the detected PC-A 20-1 through PC-N 20-*n* via the short-distance radio communication channel (step S102).

The peripheral device name and the peripheral device address received from the PC-A 20-1 through PC-N 20-*n* via the short-distance radio I/F 15 are sent from the HA transmitting and receiving section 17' to the display section 11' and the device data D/B 181' (step S104). The peripheral device name and the peripheral device address are displayed in the display section 11'. The user operates the input unit 12' to select a peripheral device name of the PC 20 which is made to connect to the mobile network 100. For example, if the PC-A20-1 is selected, a selection signal for extracting the peripheral device data of the PC-A 20-1 is transmitted from the input unit 12' to the access determining section 131'. The access determining section 131' extracts a peripheral device name and the peripheral device address corresponding to the PC-A 20-1 from the device data D/B 181' on the basis of the selection signal, so as to output to the authentication data generating section 132 (step S106).

When the PC 20 which is accessible to the mobile network 100 is selected, the user inputs an authentication key by operating the input unit 12'. The authentication key inputted from the input unit 12 is supplied to the authentication data generating section 132. The random number generating section 133 generates a random number which is supplied to the authentication data generating section 132. The authentication data generating section 132 generates authentication data by using the supplied peripheral device name, peripheral device IP address, authentication key and random number, so as to store in the authentication data D/B by relating to a peripheral device ID as a temporary ID (step S108).

The transmitting and receiving section 16 transmits the authentication data, the peripheral device ID, and the peripheral device address to the AAA server 500 on the mobile network 100 via the network I/F 14 by a transmission request of the authentication data generating section 132. The HA transmitting and receiving section 17 transmits the authentication data, the peripheral device ID, and the IP address of the AAA server 500 to the PC-A 20-1 via the short-distance radio I/F (step S112).

As described above, the user is capable of providing the authentication data by selecting the PC 20 which is desired to access the mobile network 100.

In the authentication of the handover system according to the present invention in the first and second embodiments, the mobile terminal 10 determines whether or not to authorize access, in which authentication data is generated every time to determine whether or not to authorize access, and authentication data is provided exclusively for the PC 20 which is authorized to access, so that authentication with high security can be realize by a one-time password. Moreover, a personal group list is managed by the mobile terminal 10 (user side) and the mobile network side (provider side), which enables prevention of illegal access.

Third Embodiment

A third embodiment of the handover system according to the present invention will be explained next referring to FIG. 2 and FIGS. 14 to 20. A configuration element having the reference letter same as that in the first embodiment, is configured and operated in the same manner, so that explanation thereof will be omitted.

Referring to FIG. 2, the handover system according to the third embodiment is configured to include a mobile terminal 10", a PC 20', and a personal group management server 700' in place of the mobile terminal 10, the PC 20, and the personal group management server 700 in the first embodiment.

Figure 14:
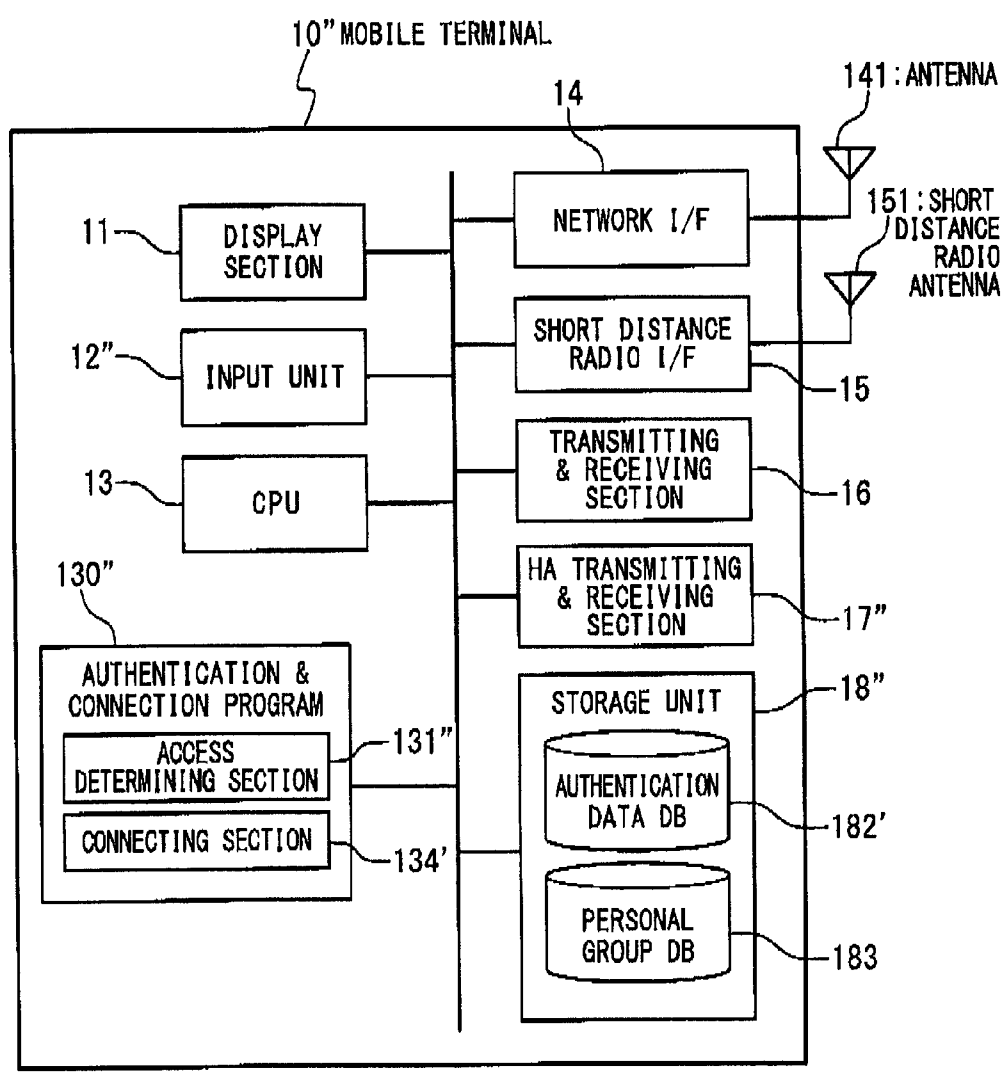
FIG. 14 is a configuration diagram in a third embodiment of the mobile terminal according to the present invention.

Referring to FIG. 14, a configuration of the mobile terminal 10" will be described. The mobile terminal 10" in the third embodiment is configured to include the display section 11, an input unit 12", the CPU 13, an authentication and connection program 130", the network I/F 14, the short-distance radio I/F 15, the transmitting and receiving section 16, an HA transmitting and receiving section 17", and a storage unit 18", each of which is connected to each other by a communication bus within the mobile terminal 10".

The input unit 12" stores the peripheral device data (the peripheral device name and the peripheral device address) of the PC 20' which is authorized to access the mobile network 100, and authentication data used for accessing the mobile network 100 in association with one another in an authentication data D/B by an operation from the user.

The authentication and connection program 130" is a program stored in a storage unit such as a memory, including an access determining section 131" and a connecting section 134'. The access determining section 131" extracts authentication data corresponding to the peripheral device data received from the PC 20' via the short-distance radio communication channel 40 from an authentication data D/B 182', and determines whether or not to authorize access to the mobile network 100 by comparing with authentication data received from the PC 20'. The access determining section 131" also causes the transmitting and receiving section 16 to transmit peripheral device data of the PC 20' which is authorized to access, and authentication data. The connecting section 134' issues a connection destination switching command for switching connection to the PC 20' which was registered in a personal group list, and performs a connection destination switching process.

When the mobile terminal 10" enters the area of the home network 300 which is a zone within the short-distance radio communication channel, the HA transmitting and receiving section 17" receives the peripheral device data and the authentication data from the PC 20' via the short-distance radio communication channel 40, and stores the peripheral device data and the authentication data in the authentication data D/B 182'.

The storage unit 18" is a storage unit such as a writable memory which cannot be used by being detached, and a detachable memory into which data can be written exclusively by the mobile terminal 10", including the authentication data D/B 182' and the personal group D/B 183.

The authentication data D/B 182' stores peripheral device data of the PC 20' which was authorized to access the mobile network 100, by relating to the authentication data. The peripheral device data and the authentication data are registered from the input unit 12" by the user of the mobile terminal 10" in advance. The peripheral device data includes, for example, a peripheral device name which is a name of the PC 20', and a peripheral device address.

Figure 15:
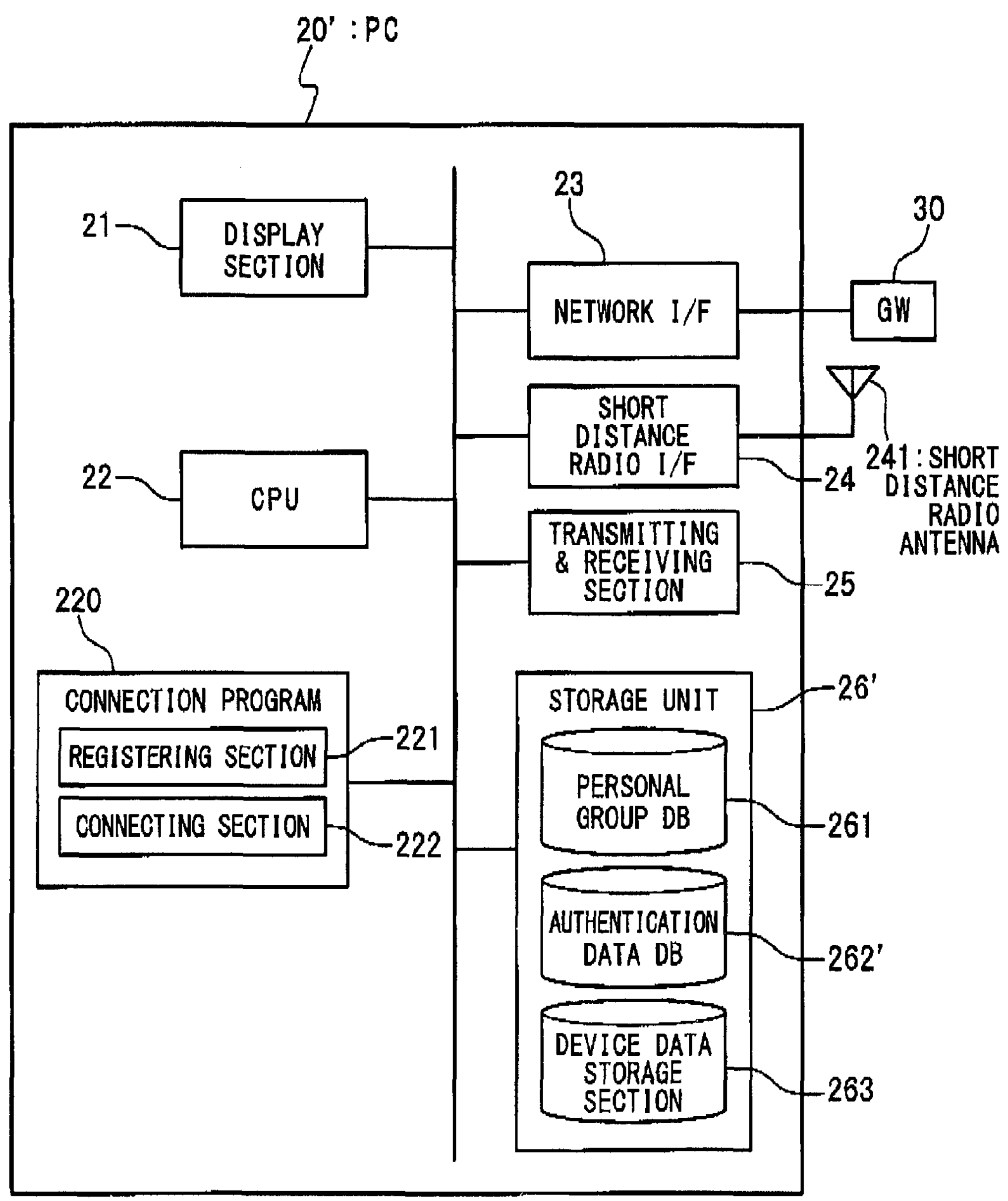
FIG. 15 is a configuration diagram in the third embodiment of the PC according to the present invention.

Referring to FIG. 15, the PC 20' in the third embodiment is configured to include a storage unit 26' in place of the storage unit 26. The storage unit 26' includes the personal group D/B 261, an authentication data D/B 262', and the device data storage section 263.

The authentication data D/B 262' stores the authentication data used for accessing the mobile network 100 by relating to the peripheral device name which is a name of the PC 20' in advance. The authentication data may be stored by receiving from the mobile terminal 10" via the short-distance radio communication channel 40 in advance, or inputted by the user from an input unit (not shown), in which there is not limitation.

Figure 16:
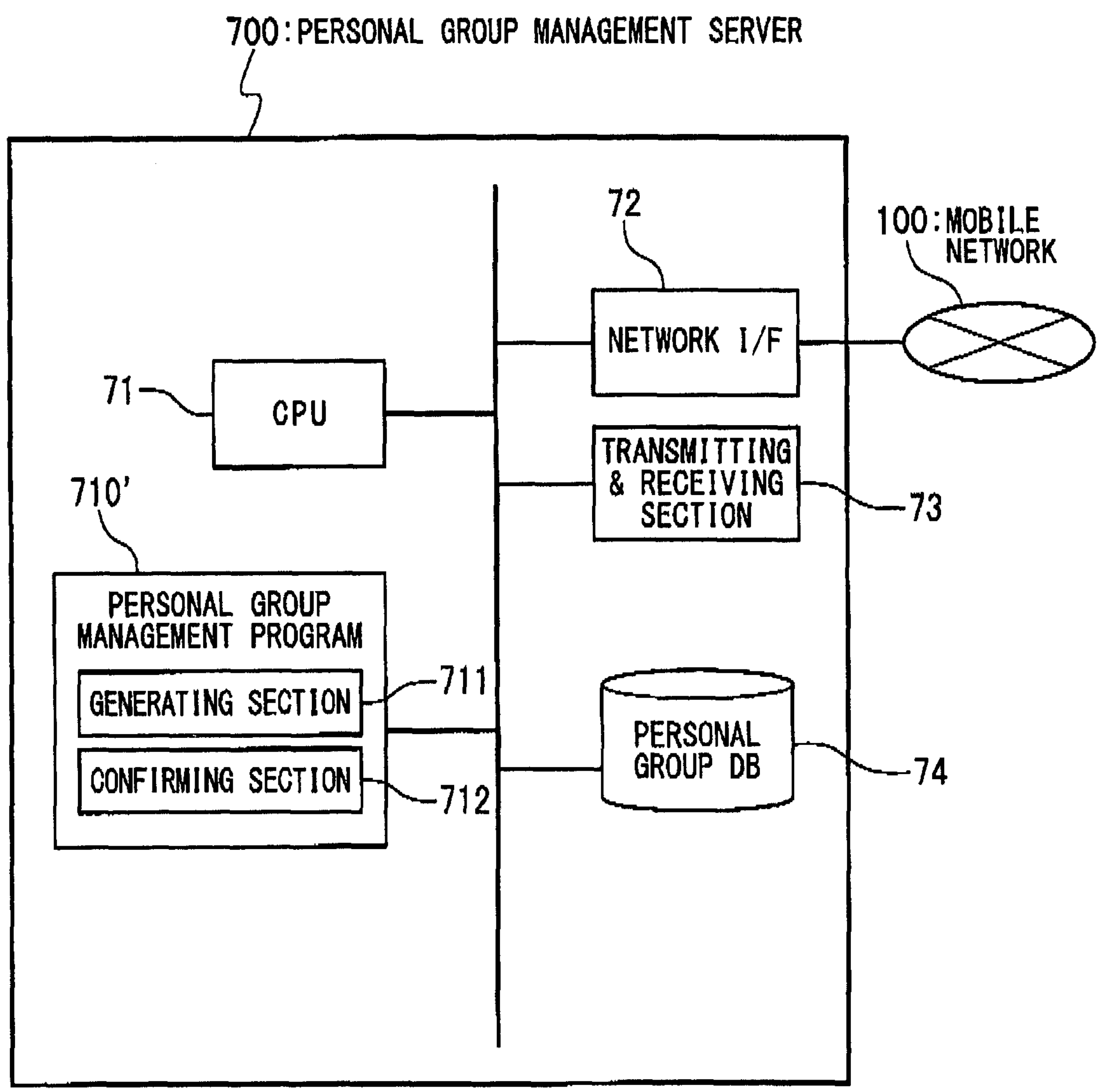
FIG. 16 is a configuration diagram in the third embodiment of the personal group management server according to the present invention.

Referring to FIG. 16, the personal group management server 700' in the third embodiment is configured to include a personal group management program 710' and the personal group D/B 74 in place of the personal group management program 710 and the personal group D/B 74 in the first embodiment.

The personal group management program 710' is stored in a storage unit such as a hard disc drive and memory, including the generating section 711 and a confirming section 712. The confirming section 712 confirms whether the PC 20' of a data distribution switching destination is registered in a personal group list corresponding to the mobile terminal 10", and if it is confirmed, authorization of switching the data distribution destination is issued to a CSCF.

Referring to FIGS. 17 to 20, an operation of the handover process in the handover system according to the third embodiment will be explained.

Figure 17A:
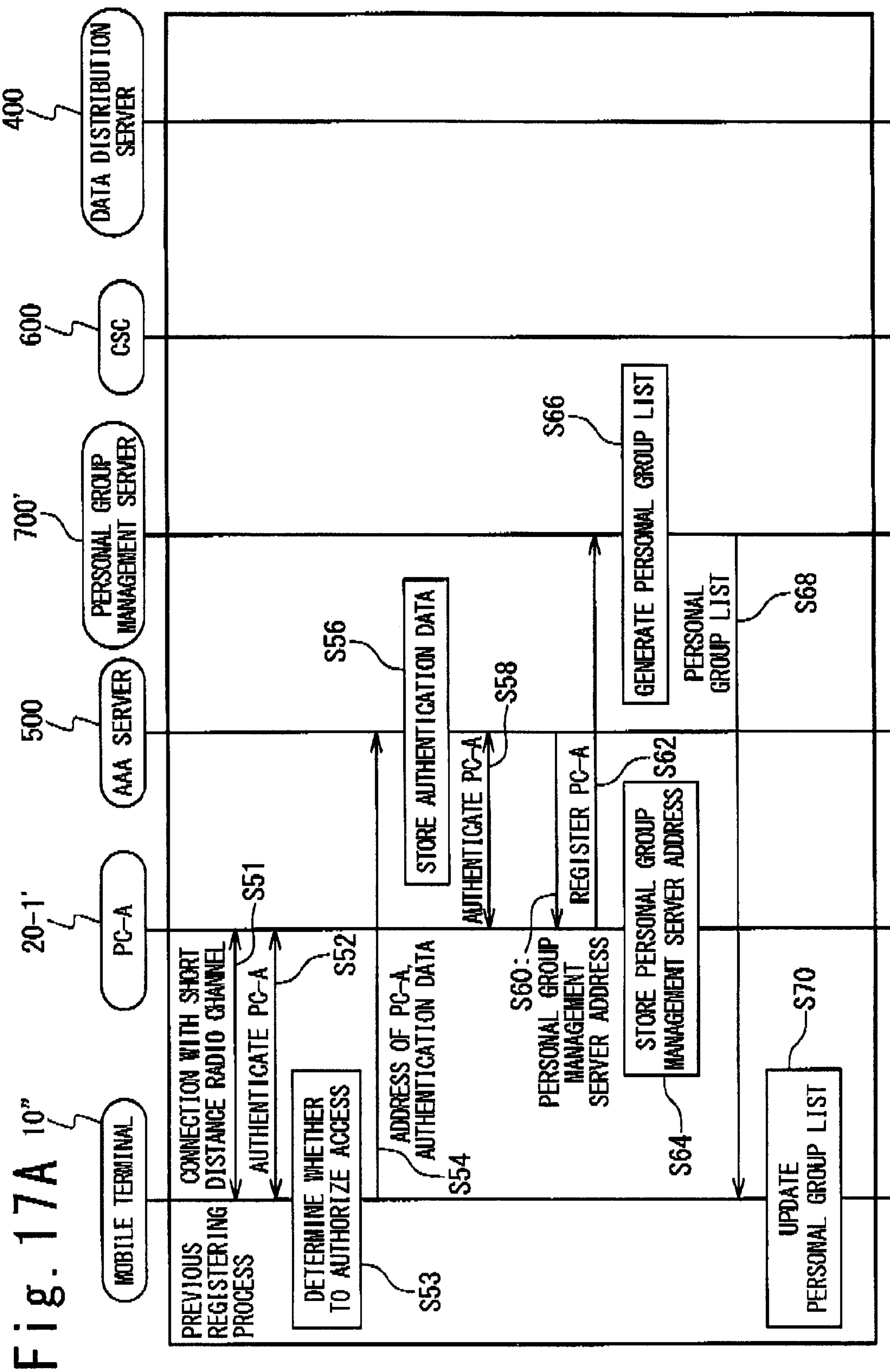
FIG. 17A is a sequence diagram of a pre-process in the third embodiment of the handover system according to the present invention.

In the third embodiment, the PC 20' accessible to the mobile network 100 is registered in a personal group list in a pre-registration process by the mobile terminal 10" which entered the area of the home network 300. Next, a distribution destination of motion picture data is switched from the mobile terminal 10" which is receiving data distribution, to the PC 20' in a process during communication. Referring to FIGS. 17A, 17B and 18, an operation of the handover process in the third embodiment will be described. Referring to FIGS. 17A and 17B, the handover process in the present embodiment will be explained using an example of an operation to switch a distribution destination of motion picture data with respect to a PC-A 20'-1 connected by the mobile terminal 10" via the short-distance radio communication channel 40. FIG. 18 is a block diagram showing an authentication operation in the present embodiment.

(Pre-Registration Process)

Referring to FIG. 17A, a user registers the PC 20' which is accessible to the data distribution server 400 in a personal group list using the mobile terminal 10' before receiving motion picture data. A pre-registration process will be explained below using an example of registering the PC-A 20'-1 to PC-N 20'-n in the personal group list.

A user operates the input unit 12" of the mobile terminal 10" to input a device name of the PC 20' which can be registered in the personal group list (e.g. PC-A 20'-1 to PC-N 20'-n), an IP address which is a peripheral device address of the respective PC 20', and a password as authentication data (It is assumed here that the user obtains a global IP address if an IP address of the PC 20' is a private IP address). The mobile terminal 10" stores the inputted peripheral device name, peripheral device address of the PC 20' and authentication data in association with one another in the authentication data D/B 182'. A password may be obtained in advance from a provider which manages the data distribution server 400 (e.g. at the time of making a contract of data distribution), or may be prepared by the user. It is preferable to use a different password in the respective PC 20'. The authentication data as described above is associated with the user ID to identify the user, and registered in the authentication data D/B 262' of the respective PC 20'.

When the mobile terminal 10" enters the area of the home network 300, the mobile terminal 10" performs a process to access the PC-A 20'-1 to PC-N 20'-n in the area of the home network 300 via the short-distance radio communication channel 40 (step S51).

When a link is established via the short-distance radio communication channel 40, the registration section 221 in each of the PC-A 20'-1 through PC-N 20'-n transmits peripheral device data including the peripheral device name and the peripheral device address, and the authentication data to the mobile terminal 10" via the short-distance radio communication channel 40. The mobile terminal 10" compares the authentication data corresponding to the peripheral device data with the authentication data stored in the authentication data D/B 182', so as to determine whether or not to authorize access (step S52 and step S53). If the PC-A 20-1' is determined as a peripheral device authorized to access, the authentication data, the peripheral device name and the peripheral device address thereof are associated by the mobile terminal 10", and transmitted to the AAA server (step S54). At this time, if the peripheral device address is a private IP address, the PC-A 20'-1 obtains a global IP address from the GW 30 in advance, and the global IP address is transmitted to the mobile terminal 10" by the PC-A 20'-1, so that the mobile terminal 10" transmits the global IP address to the AAA server 500 as the peripheral device address.

Figure 19:
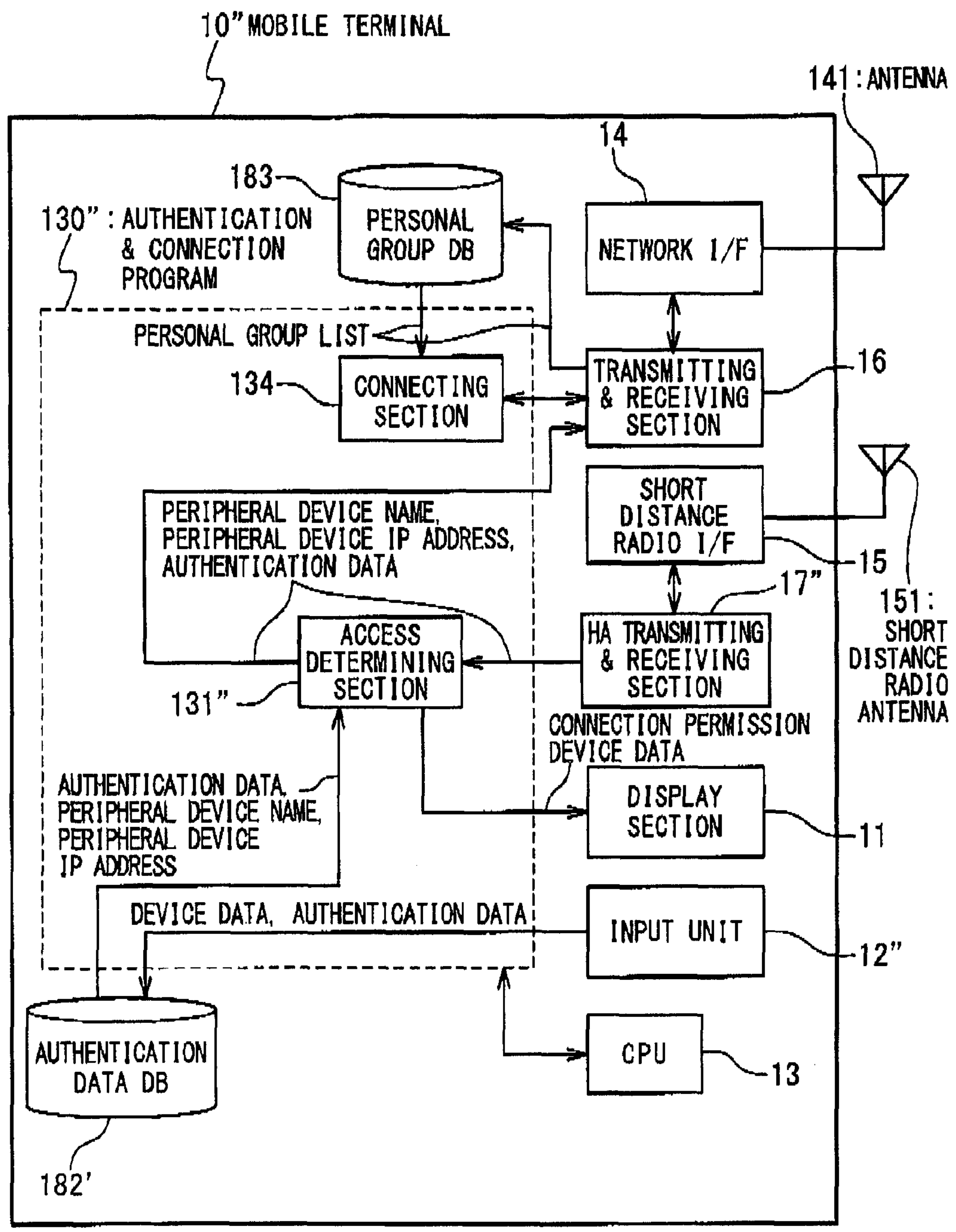
FIG. 19 is a block diagram at the time of the authentication operation in the third embodiment of the mobile terminal according to the present invention.
Figure 20:
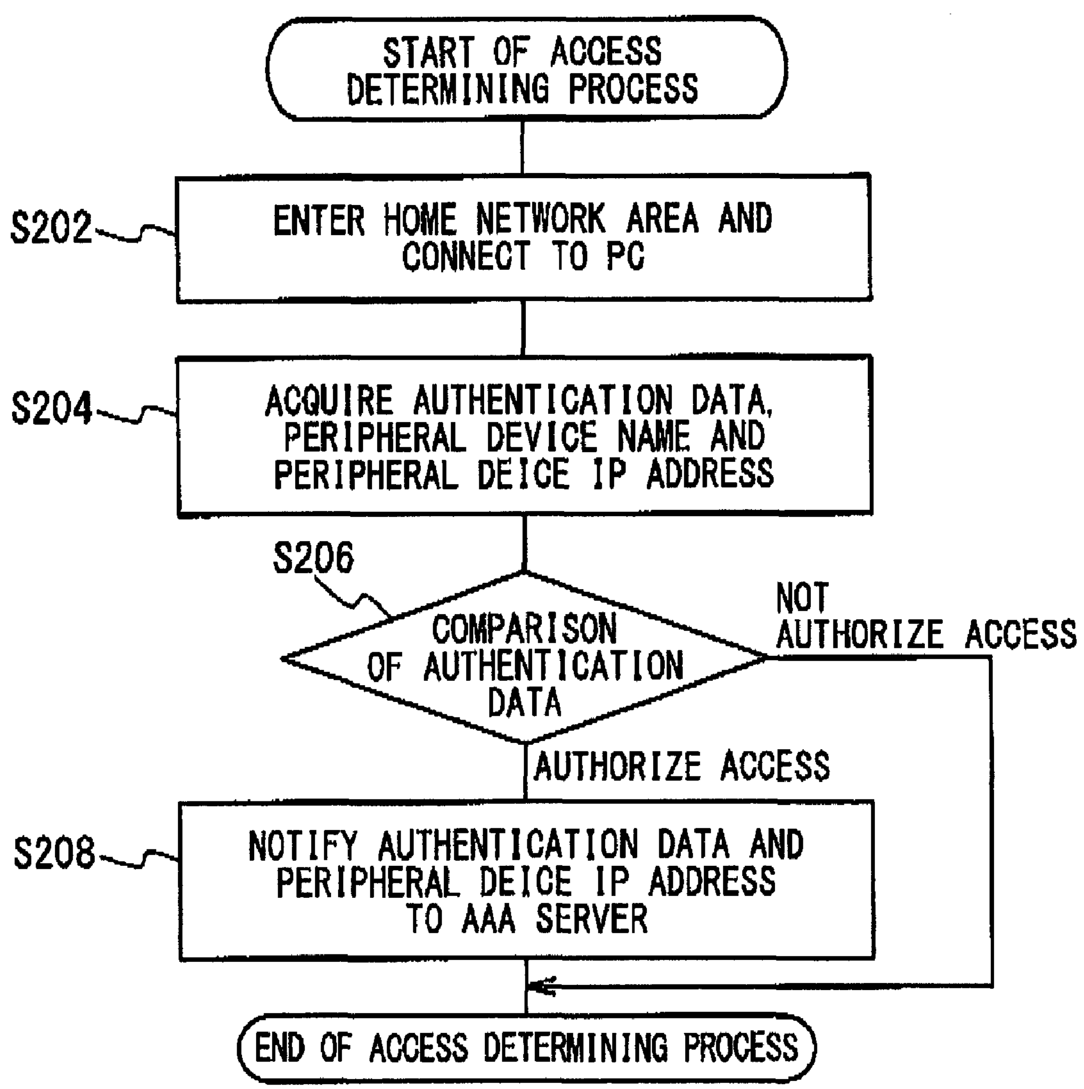
FIG. 20 is a flowchart of a process to determine whether or not to authorize access in the third embodiment of the mobile terminal according to the present invention.

An operation in the mobile terminal 10" from entering the area of the home network 300 (step S51) to providing authentication data (step S54) will be explained, referring to FIGS. 19 and 20.

When the mobile terminal 10" enters the area of the home network 300, the HA transmitting and receiving section 17" detects the PC-A 20'-1 to PC-N 20'-n in the area of the home network 300 via the short-distance radio communication channel 40. The HA transmitting and receiving section 17" performs a process to access the detected PC-A 20'-1 through PC-N 20'-n via the short-distance radio communication channel 40 (step S202).

The peripheral device name, the peripheral device address, and the authentication data received from the PC-A 20'-1 through PC-N 20'-n via the short-distance radio I/F 15 are sent from the HA transmitting and receiving section 17" to the access determining section 131" (step S204). The access determining section 131" uses the authentication data D/B 182' to extract authentication data corresponding to the peripheral device data received from the respective PC 20', and determines whether or not to authorize access to the mobile network 100 by comparing with the authentication data received from the respective PC 20' (step S206). The PC 20' is determined that the access is not authorized it received authentication data is not consistent with stored authentication data, while the transmitting and receiving section 16 transmits the peripheral device data of the PC 20' including a peripheral device name and a peripheral device address, and authentication data to the AAA server 500 it the consistent data exists (step S208). At this time, the peripheral device data of the PC 20 which was authorized to access is sent to the display section 11 and displayed therein. The user is capable of confirming an accessible peripheral device name displayed in the display section 11.

Referring to FIG. 17, the authentication section 511 of the AAA server 500 stores the peripheral device address of the PC-A 20'-1 and authentication data to be received via the network I/F 52 in the authentication data D/B 541 (step S56). The authentication section 511 also issues an authentication data request signal to the PC-A 20'-1 via the mobile network 100 and the Internet 200 on the basis of a peripheral device address stored in the authentication data D/B 541, and starts an authentication process (step S58).

The registration section 221 of the PC-A 20'-1 extracts authentication data and a peripheral device name from the authentication data D/B 262' on the basis of the received authentication data request signal, so as to transmit to the AAA server 500 via the network I/F 23. The authentication section 511 of the AAA server 500 extracts authentication data corresponding to the received peripheral device name from the authentication data D/B 541, and executes an authentication process by comparing with the authentication data received from the PC-A 20'-1 (step S58).

If the PC-A 20'-1 is authenticated as a legitimate terminal here, the authentication section 511 of the AAA server 500 extracts an IP address of the personal group management server 700' (a personal group management server address) from the personal group management server address D/B 55, so as to transmit to the PC-A 20'-1 (step S60).

The registration section 221 or the PC-A20'-1 transmits the peripheral device data including the peripheral device name and the peripheral device address, a user ID, and an IP address of the mobile terminal 10" (terminal device address) to the personal group management server 700' via the Internet 200 and the mobile network 100 on the basis of a received personal group management server address (step S62). The registration section 221 also stores an IP address of the personal group management server 700' in the personal group D/B 261 (step S64).

On the basis of peripheral device data and a user ID received from the PC-A20'-1, the generating section 711' of the personal group management server 700' generates a personal group list corresponding to the user ID (step S66). At this time, if the personal group list corresponding to the user ID exists already, personal group data is updated by adding new peripheral device data to peripheral device data of the personal group list. The transmitting and receiving section 73 transmits the generated personal group list to the mobile terminal 10" via the mobile network 100 on the basis of the terminal device address of the mobile terminal 10" corresponding to the user ID (step S68).

The transmitting and receiving section 16 of the mobile terminal 10" associates the received personal group list with a name of the mobile network 100 to be accessible, so as to store in the personal group list D/B 183. At this time, if the personal group list associated with the mobile network 100 exists, the personal group list is updated (step S70). The personal group list is displayed in the display section 11, so that the user is capable of confirming the updated personal group list. The mobile terminal 10" repeats operations from the step S52 through the step S70, so that the PC 20' authorized to access the mobile network 100 (having authentication data) among the remaining PC-B 20'-2 to PC-N 20'-n in the area of the home network 300 can be registered in the personal group list.

(Process During Communication)

Next, referring to FIG. 17B, a process during communication will be explained, in which a receiving destination is changed while the mobile terminal 10" is receiving motion picture data from the data distribution server 400 and performing streaming reproduction. A process during communication will be explained in the present embodiment using an example case of switching a data receiving destination from the mobile terminal 10" to the PC-A 20'-1 by a user who holds the mobile terminal 10".

When the mobile terminal 10" which is receiving motion picture data enters the area of the home network 300 (step S74), the HA transmitting and receiving section 17" of the mobile terminal 10" detects the PC-A 20'-1 to PC-N 20'-n in the area of the home network 300. The user confirms a personal group list displayed in the display section 11, and operates the input unit 12" to select the PC 20' of an access switching destination out of the respective PC 20' accessed via the short-distance radio communication channel 40 (step S76). The connecting section 134' issues a switching request signal to allow connection between the selected PC-A 20'-1 and the data distribution server (step S76). At this time, a session control message is used as an connection destination switching request signal, and the peripheral device address of the PC-A 20'-1 in the authentication data D/B is included in the session control message which is issued to the CSC 600.

The CSC 600 which received the connection destination switching request issues a member confirmation signal in order to confirm in the personal group management server 700' whether or not the PC-A 20'-1 is included in the personal group list of the mobile terminal 10" of a request source. The confirming section 712 of the personal group management server 700' which received the member confirmation signal refers to the personal group list corresponding to the user ID of the mobile terminal 10', and if it is confirmed that the peripheral device data of the PC-A 20'-1 is included (the PC-A 20'-1 is a member of a personal group), an authentication request for authenticating the PC-A 20'-1 is issued to the AAA server 500. The authentication section 511 of the AAA server 500 which received the authentication request issues an authentication data request signal to the PC-A 20'-1 via the mobile network 100 and the Internet 200 on the basis of the peripheral device address in the authentication data D/B 541, and starts an authentication process (step S80).

The transmitting and receiving section 25 of the PC-A 20'-1 extracts authentication data from the authentication data D/B 262' in response to the received authentication data request signal, so as to transmit to the AAA server 500 via the network I/F 23. The authentication section 511 of the AAA server 500 extracts authentication data from the authentication data D/B 541, and executes an authentication process by comparing with the authentication data received from the PC-A 20'-1. If the PC-A 20'-1 is authenticated as a legitimate terminal, the authentication section 511 issues an authentication authorization signal to the personal group management server 700' of an authentication request source. When the authentication authorization signal is received, the confirming section 712 issues an authentication completion signal to the CSC 600 of a issuing source of the member confirmation signal, so that the member confirmation process of the PC-A 20'-1 is completed (step S82). If the PC 20' is not authenticated here, the AAA server 500 notifies the personal group management server 700' of NG, and the personal group management server 700' also notifies the CSC 600 of NG. The CSC 600 which accepted NG notifies the mobile terminal 10" of a request source to change access, of an unauthenticatable notice, and the access process is completed.

When the member confirmation process is completed, the CSC 600 issues a session switching authorization signal to the mobile terminal 10" in order to authorize distribution destination switching (step S84).

The mobile terminal 10" which received the session switching authorization signal starts a handover process in order to switch a distribution destination. The connecting section 134 of the mobile terminal 10" issues a distribution destination switching request signal to the data distribution server 400 in order to switch a distribution destination of motion picture data from the mobile terminal 10" to the PC-A 20'-1 (step S86). The data distribution server 400 performs session connection to the PC-A 20'-1 (step S88). Thereafter, the data distribution server 400 switches the distribution destination of the motion picture data from the mobile terminal 10" to the PC-A20'-1. When the handover process is completed, the session between the mobile terminal 10" and the data distribution server 400 is disconnected (step S90). The data distribution server 400 distributes the motion picture data to the PC-A 20'-1 without interruption (step S92).

As described above, the handover system according to the present invention is capable of changing a distribution destination of motion picture data being streaming data, from the mobile terminal 10" to the PC-A 20-1' seamlessly, so that a motion picture which was subjected to streaming reproduction in the mobile terminal 10" can be continuously watched by the user in the display section 21 of the PC-A 20'-1.

Authentication data used for authentication between the mobile terminal 10" and the PC 20' which is a peripheral device accessible via the short-distance radio communication channel 40, is thus used for authentication between the PC 20' and the AAA server 600, so that a terminal which is capable of using a data distribution service is not limited to the mobile terminal 10", but can be expanded to a device which is authenticatable by the mobile terminal 10".

A device (PC 20') which is registered as a terminal of a data distribution destination is also registered as a personal group for each user (mobile terminal 10") and stored in the mobile terminal 10" and the personal group management server 700' on the mobile network 100, thereby the PC 20' to be used can be limited or integrally managed, which allows security improvement.

Furthermore, the PC 20' which is accessible to the mobile terminal 10" via the short-distance radio communication channel 40 is selected as a device of a distribution destination in the area of the home network 300. Therefore, a terminal of a distribution switching destination can be selected among the PC 20' in the area of the home network 300 without selecting the PC 20' disposed in a long distance from the mobile terminal 101' (the user).

Although the embodiments of the present invention were described above, detailed configurations are not limited to the above stated embodiments, and changes to be made in a range without exceeding what is claimed in the present invention are also included in the present invention. Although the authentication system according to the present embodiment is expressed by using the example case of having different kinds of networks that are separated into the mobile network 100 and the Internet 200, the authentication system may be configured to access a network 100' and a network 200' in the same kind that were constructed by each company. The authentication system may also be used for authenticating a service provided by a network for being used between the mobile terminal 10 and the peripheral device 20 that are made to access the same network 100".

The invention claimed is:

1. An authentication system comprising:

an authentication server;

a terminal device configured to be connected to said authentication server and be authenticated by said authentication server;

a peripheral device configured to be connected to said terminal device; and a personal group management server configured to be connected to said terminal device, wherein said peripheral device transmits an identification data for identifying said peripheral device itself to said terminal device, said terminal device performs a first authentication on the basis of said identification data, and transmits an authentication data to said authentication server if said terminal device determines that said peripheral device is authenticated, and said authentication server performs a second authentication with respect to said peripheral device by using said authentication data, wherein said personal group management server relates said terminal device to a peripheral device which is authenticated in said first authentication of said terminal device so as to register and store as a personal group list, and transmits said personal group list to said terminal device, wherein said authentication server notifies a peripheral device which is authenticated of a personal group management server address which is an address of said personal group management server on said basis of said authentication data, said peripheral device transmits a peripheral device identifying data for identifying said peripheral device and a terminal device identifying data for identifying said terminal device to said personal group management server on said basis of said personal group management server address, and said personal group management server generates said personal group list by relating said peripheral device identifying data to said terminal device identifying data.

2. An authentication system comprising:

an authentication server;

a terminal device configured to be connected to said authentication server and be authenticated by said authentication server; and a peripheral device configured to be connected to said terminal device, wherein said peripheral device transmits an identification data for identifying said peripheral device itself to said terminal device, said terminal device performs a first authentication on the basis of said identification data, and transmits an authentication data to said authentication server if said terminal device determines that said peripheral device is authenticated, and said authentication server performs a second authentication with respect to said peripheral device by using said authentication data, wherein said peripheral device transmits a peripheral device identifying data for identifying itself to said terminal device when said peripheral device accesses to a terminal device, said terminal device performs said first authentication on the basis of said peripheral device identifying data, generates an authentication data by using said peripheral device identifying data if determining that said peripheral device is said authenticated, and transmits said authentication data to said authentication server and said peripheral device, and said authentication server performs said second authentication by comparing an authentication data stored in said peripheral device with said authentication data transmitted from said terminal device, wherein said peripheral device transmits a peripheral device name which is a name of said peripheral device itself and a peripheral device address which is an address of said peripheral device itself as said peripheral device identifying data to said terminal device when said peripheral device accesses to said terminal device, and said terminal device generates said authentication data by using said peripheral device name and said peripheral device address of said peripheral device which is authenticated.

3. The authentication system according to claim 2, wherein said terminal device relates an peripheral device ID for identifying a peripheral device which is authenticated in a first authentication to an authentication data generated on the basis of said peripheral device identifying data so as to transmit to said peripheral device and said authentication server, said peripheral device transmits an authentication data to which said peripheral device ID is added to said authentication server, and said authentication server executes said second authentication by comparing an authentication data owned with an authentication data received from said peripheral device ID on the basis of said peripheral device ID.

4. An authentication system comprising:

an authentication server;

a terminal device configured to be connected to said authentication server and be authenticated by said authentication server; and a peripheral device configured to be connected to said terminal device, wherein said peripheral device transmits an identification data for identifying said peripheral device itself to said terminal device, said terminal device performs a first authentication on the basis of said identification data, and transmits an authentication data to said authentication server if said terminal device determines that said peripheral device is authenticated, and said authentication server performs a second authentication with respect to said peripheral device by using said authentication data, wherein said peripheral device transmits an authentication data owned by itself as said identification data to said terminal device, when said peripheral device accesses said terminal device, said terminal device executes said first authentication on the basis of an authentication data transmitted by said peripheral device, and if an authentication data which is consistent with said authentication data exists, said terminal device is authenticated and transmits said authentication data to said authentication server, and said authentication server executes said second authentication with respect to said peripheral device by using an authentication data transmitted by said terminal device, wherein said terminal device transmits a peripheral device address and said authentication data to said authentication server, said authentication server refers to said peripheral device address, accesses said peripheral device to obtain said authentication data, and executes second authentication by comparing said authentication data with said authentication data obtained from said terminal device.

5. The authentication system according to claim 1, wherein said terminal device and said peripheral device are connected by radio channels.

6. The authentication system according to claim 1, wherein said terminal device is a mobile terminal, which is mobile.

7. An authentication system comprising:

an authentication server;

a terminal device configured to be connected to said authentication server and be authenticated by said authentication server;

a peripheral device configured to be connected to said terminal device; and a first communication system configured to be accessible by said terminal device, wherein said peripheral device transmits an identification data for identifying said peripheral device itself to said terminal device, said terminal device performs a first authentication on the basis of said identification data, and transmits an authentication data to said authentication server if said terminal device determines that said peripheral device is authenticated, and said authentication server performs a second authentication with respect to said peripheral device by using said authentication data, wherein said authentication server is connected to said first communication system, and executes said second authentication for allowing said peripheral device to access said first communication system by using said authentication data, said peripheral device which is authenticated to access in said second authentication accesses said first communication system.

8. The authentication system according to claim 7, further comprising:

a second communication system configured to be connected to said first communication system, wherein said peripheral device is connected to said second communication system and receives said second authentication for access to said first communication system via said second communication system.

9. A handover system comprising:

an authentication system, wherein said authentication system includes:

an authentication server, a terminal device configured to be connected to said authentication server and be authenticated by said authentication server, a peripheral device configured to be connected to said terminal device, and a first communication system configured to be accessible by said terminal device; and a session control device configured to be connected to said first communication system, wherein said peripheral device transmits an identification data for identifying said peripheral device itself to said terminal device, said terminal device performs a first authentication on the basis of said identification data, and transmits an authentication data to said authentication server if said terminal device determines that said peripheral device is authenticated, said authentication server, which is connected to said first communication system, performs a second authentication with respect to said peripheral device for allowing said peripheral device to access said first communication system by using said authentication data, and said peripheral device which is authorized to access in said second authentication accesses said first communication system, wherein said session control device switches a session between said terminal device and said first communication system to a session between said peripheral device which is authenticated in said authentication and said first communication system, in response to a connection destination switching request from said terminal device which is communicating with said first communication system.

10. The handover system according to claim 9, wherein said terminal device issues a connection destination switching request for changing a connection destination to said peripheral device to said session control device, said session control device issues a member confirmation signal to said personal group management server, said personal group management server refers to said personal group list in accordance with said member confirmation signal, and issues an authentication request to said authentication server if said peripheral device is related to said terminal device, said authentication server authenticates said peripheral device by using said authentication data in response to said authentication request, and said session control device switches said session between said first communication system and said terminal device, to said session between said peripheral device which is authenticated in said authentication and said first communication system.

11. The handover system according to claim 9, wherein said terminal device issues a connection destination switching request to said peripheral device, said peripheral device transmits said authentication data to said authentication server in response to said connection destination switching request, said authentication server authenticates said peripheral device by using said authentication data, and said session control device switches said session between said first communication system and said terminal device, to said session between said peripheral device which is authenticated in said authentication and said first communication system on the basis of said authentication.

12. The handover system according to claim 9, further comprising:

a data distribution server configured to be connected to said first communication system, and transmit data to said terminal device, wherein said session control device switches a session between a terminal device which is receiving said data and said data distribution server to a session between said peripheral device and said data distribution server in response to said connection destination switching request from said terminal device, and said data distribution server continuously transmits said data to said peripheral device.

13. The handover system according to claim 9, further comprising:

a second communication system configured to be connected to said first communication system, wherein said peripheral device is connected to said second communication system, and said session control device switches a connection between said terminal device and said first communication system to a connection between said peripheral device and said communication system through said first communication system and said second communication system in response to said communication destination switching request.

14. The handover system according to claim 9, wherein a connection between said peripheral device and said first communication system is disconnected, when a connection between said terminal device and said peripheral device through said communication channel is disconnected.

15. A terminal device which is authenticated by an authentication server, comprising:

an area of the home network (HA) transmitting and receiving section configured to receive peripheral device data which identify peripheral devices from said peripheral devices;

a display section configured to display said peripheral device data;

a device data database configured to store said peripheral device data;

an input unit configured to select an accessible peripheral device from said displayed peripheral device data;

an access determining section configured to extract a displayed peripheral device data corresponding to said selected displayed peripheral device from said device data database; and an authentication data generating section configured to generate an authentication data used for authentication of said peripheral device by said authentication server on the basis of said peripheral device data.

16. The terminal device according to claim 15, further comprising:

an input device; and a random number generating section, wherein said authentication data generating section generates an authentication data by using an authentication key supplied by said input device, a random number outputted by said random number generating section and said peripheral device data.

17. An authentication method, comprising:

a terminal device, which is authenticated by an authentication server, connecting to a peripheral device;

said peripheral device transmitting an identification data for identifying itself to said terminal device;

said terminal device determining whether or not it is authenticated in a first authentication on the basis of said identification data;

said terminal device transmitting an authentication data for performing a second authentication to said authentication server when determining it is authenticated in said first authentication;

said authentication server performing a second authentication with respect to said peripheral device by using said authentication data;

said peripheral device accessing to said terminal device;

said peripheral device transmitting a peripheral device name which is a name of said peripheral device itself and a peripheral device address which is an address of said peripheral device itself to said terminal device;

said terminal device generating said authentication data on the basis of said peripheral device name and said peripheral device address, and transmitting said authentication data to said authentication server and said peripheral device.

18. The authentication method according to claim 17, further comprising:

said peripheral device transmitting an authentication data owned by itself, a peripheral device name which is a name of said peripheral device itself and a peripheral device address which is an address of said peripheral device itself to said terminal device, when said peripheral device accesses said terminal device;

said terminal device comparing an authentication data owned by itself with an authentication data received from said peripheral device; and said terminal device transmitting an authentication data which is consistent in said comparison.

19. An authentication method, comprising:

a terminal device, which is authenticated by an authentication server, connecting to a peripheral device;

said peripheral device transmitting an identification data for identifying itself to said terminal device;

said terminal device determining whether or not it is authenticated in a first authentication on the basis of said identification data;

said terminal device transmitting an authentication data for performing a second authentication to said authentication server when determining it is authenticated in said first authentication;

said authentication server performing a second authentication with respect to said peripheral device by using said authentication data;

registering a personal group list in said communication side, wherein said personal group list relates a peripheral device which is authenticated in said determination whether or not it is authenticated in said first authentication to a terminal device which authenticates said peripheral device;

transmitting said personal group list related to said terminal device to said terminal device; and said terminal device storing said personal group list.

20. The authentication method according to claim 19, further comprising:

a peripheral device, which is authenticated in said determination whether or not it is authenticated in said first authentication, transmitting data for identifying said peripheral device and data for identifying a terminal device which authenticates said peripheral device;

generating said personal group list by relating data for identifying said peripheral device to data for identifying a terminal device which authenticates said peripheral device.

21. A method of generating an authentication data, comprising:

receiving peripheral device data which identify peripheral devices from said peripheral devices;

displaying said peripheral device data;

storing said peripheral device data;

selecting a peripheral device which is authenticated from said displayed peripheral device data;

an access determining section configured to extract a displayed peripheral device data corresponding to said selected displayed peripheral device from said device data database; and generating an authentication data used for authentication of said peripheral device by said authentication server on the basis of said peripheral device data.

22. A method of generating an authentication data, comprising:

acquiring a peripheral device data for identifying a peripheral device from said peripheral device;

determining whether or not it is authenticated in a first authentication by comparing a peripheral device data which is owned by itself and is a data of a peripheral device with said acquired peripheral device data;

outputting a peripheral device data of a peripheral device which is authenticated in said determination whether or not it is authenticated in said first authentication;

generating an authentication data used for a determination whether or not it is authenticated in a second authentication;

inputting an authentication key; and generating a random number, wherein said step of generating said authentication data includes:

generating said authentication data by using said authentication key, said random number and said peripheral device data.

23. A peripheral device which is connected to a second communication system, comprising:

an interface configured to be connected through a communication channel to a terminal device accessible to a first communication system;

a transmitting and receiving section configured to transmit an identification data of itself through said interface to said terminal device, and receive an authentication data, which is generated on the basis of said identification data, used for access to said first communication system from said terminal device;

a connection section configured to transmit said authentication data through said second communication system to said first communication system, and perform connection process with said first communication system a register section configured to register a personal group which relates said terminal device permits a connection to said first communication system to a peripheral device name of itself, wherein said transmitting and receiving section receives an address of a personal group management server from said first communication system, and said register section on the basis of said address transmits an identifier of said terminal device and said peripheral device name to said first communication system and registers said personal group.

24. The peripheral device according to claim 23, wherein said identification data is a name of itself or an address of itself.

25. The peripheral device according to claim 23, wherein said identification data includes an authentication data for a connection to said terminal device.

* * * * *